(12) United States Patent
Floor et al.

(10) Patent No.: US 12,552,102 B2
(45) Date of Patent: Feb. 17, 2026

(54) DUAL FILAMENT FEEDER ASSEMBLY FOR AN ADDITIVE MANUFACTURING SYSTEM

(71) Applicant: Ultimaker B.V., Utrecht (NL)

(72) Inventors: Jan Willem Floor, Utrecht (NL); Samuel Thomas Kent, Utrecht (NL)

(73) Assignee: Ultimaker B.V., Zaltbommel (NL)

( * ) Notice: Subject to any disclaimer, the term of this patent is extended or adjusted under 35 U.S.C. 154(b) by 241 days.

(21) Appl. No.: 18/251,408

(22) PCT Filed: Nov. 1, 2021

(86) PCT No.: PCT/NL2021/050665
§ 371 (c)(1),
(2) Date: May 2, 2023

(87) PCT Pub. No.: WO2022/098231
PCT Pub. Date: May 12, 2022

(65) Prior Publication Data
US 2024/0009927 A1 Jan. 11, 2024

(30) Foreign Application Priority Data
Nov. 5, 2020 (NL) ..................................... 2026827

(51) Int. Cl.
*B29C 64/118* (2017.01)
*B29C 64/209* (2017.01)
*B29C 64/336* (2017.01)
*B33Y 30/00* (2015.01)

(52) U.S. Cl.
CPC .......... *B29C 64/336* (2017.08); *B29C 64/118* (2017.08); *B29C 64/209* (2017.08); *B33Y 30/00* (2014.12)

(58) Field of Classification Search
CPC ... B29C 64/336; B29C 64/209; B29C 64/118; B33Y 30/00
See application file for complete search history.

(56) References Cited

U.S. PATENT DOCUMENTS 9,469,071 B2 * 10/2016 Douglass .............. B29C 64/106

* cited by examiner

*Primary Examiner* — JaMel M Nelson
*Assistant Examiner* — Erica Hartsell Funk
(74) *Attorney, Agent, or Firm* — Ipsilon USA—NLO

(57) ABSTRACT

A dual filament feeder assembly (110) for an additive manufacturing system (400) comprises a drive wheel (206) and a drive shaft (134) connected to the drive wheel. The dual filament feeder assembly (110) comprises a first feeder wheel (210) and a second feeder wheel (250) rotatably arranged around the drive shaft at a first side and a second side of the drive wheel (206). The dual filament feeder assembly further comprises a coupling member (270) arranged to selectively couple the drive wheel with the first feeder wheel (210) or the second feeder wheel (250). A shifting member (280) is arranged to move the coupling member between a first position and a second position. The coupling member drivably couples the drive wheel (206) with the first feeder wheel in the first position and couples the drive wheel with the second feeder wheel in the second position.

17 Claims, 12 Drawing Sheets

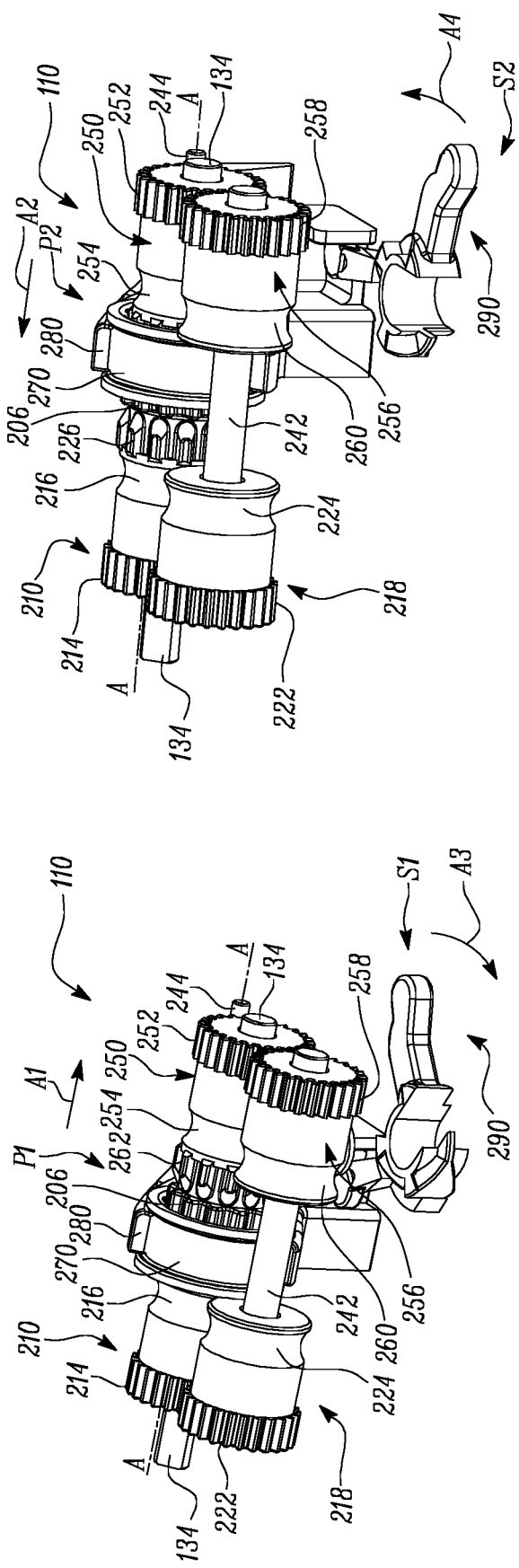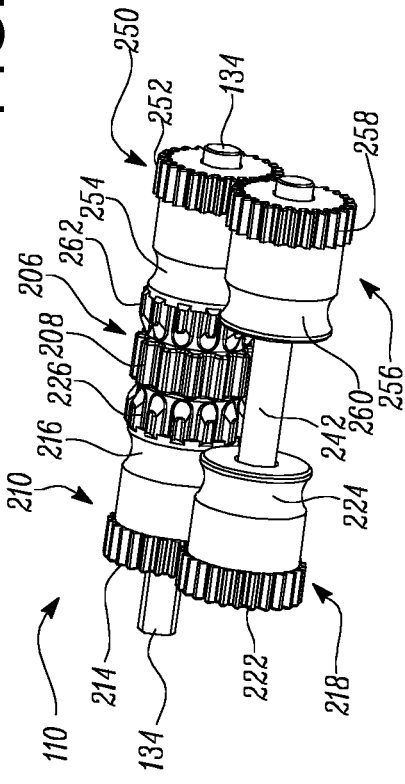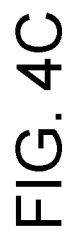

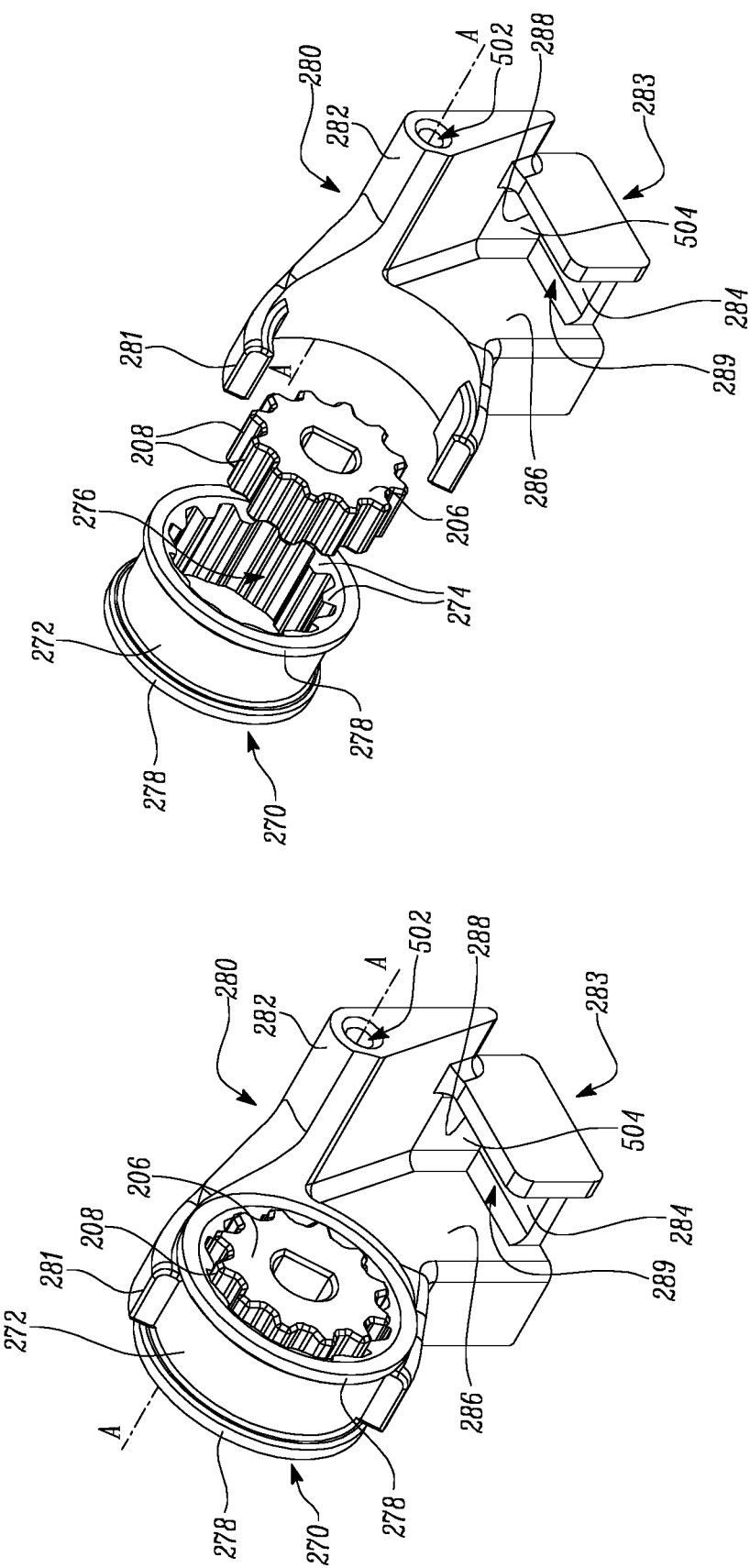

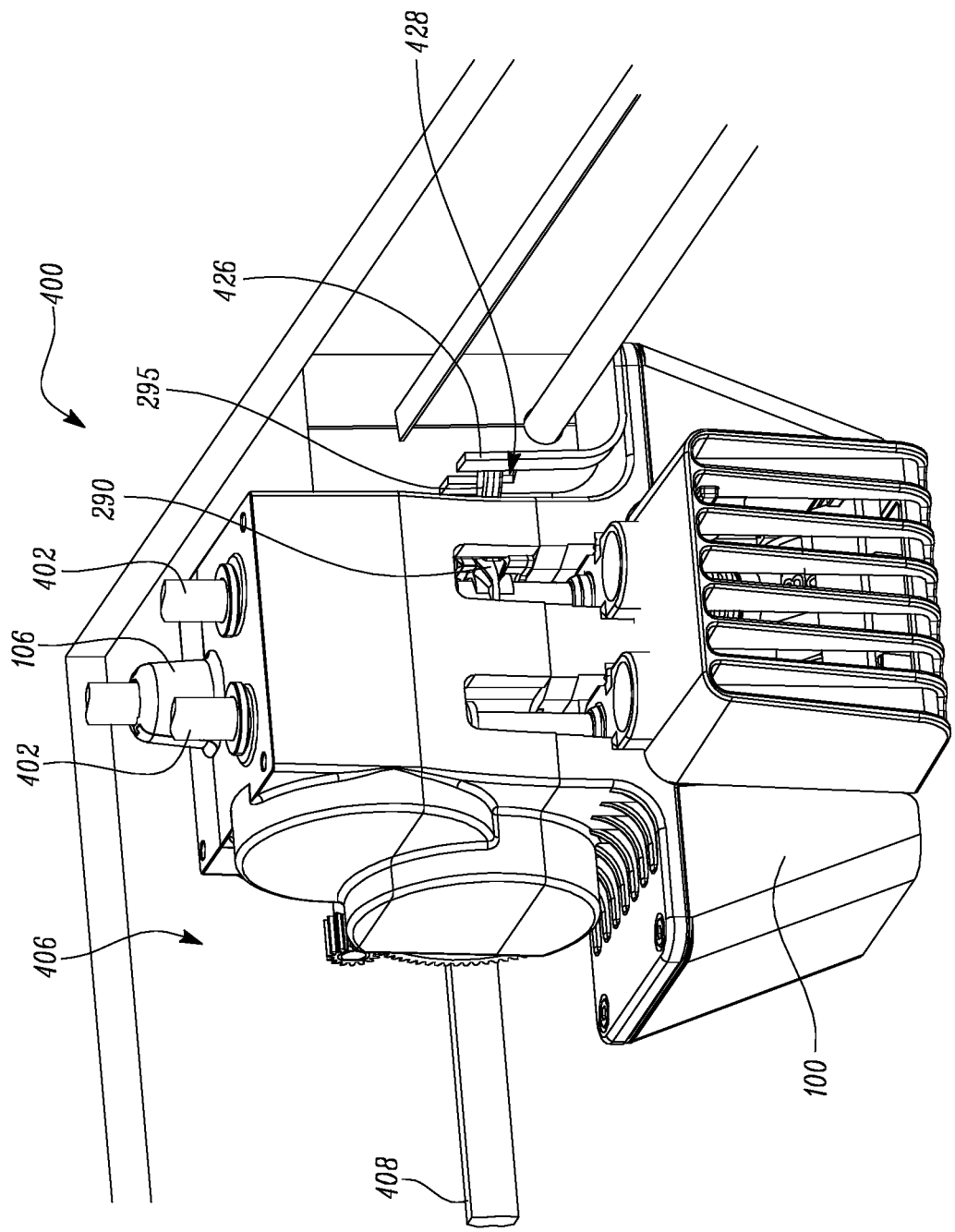

DUAL FILAMENT FEEDER ASSEMBLY FOR AN ADDITIVE MANUFACTURING SYSTEM

FIELD OF THE INVENTION

The present invention relates to a dual filament feeder assembly for an additive manufacturing system. The invention also relates to a dual extruder print head for an additive manufacturing system comprising a dual filament feeder assembly. The invention also relates to an additive manufacturing system comprising such a dual extruder print head.

BACKGROUND ART

Fused filament fabrication (FFF) is an additive manufacturing process that typically uses a continuous filament of a thermoplastic material. The filament may be fed from a filament supply to a moving, heated print head, and may be deposited through a print nozzle onto an upper surface of a build plate. Further, the print head may be moved relative to the build plate under computer control to define a printed shape. In certain FFF devices, the print head may move in two dimensions to deposit one horizontal plane, or a layer, at a time. A work is therefore formed by the deposited layers. The work or the print head may then be moved vertically by a small amount to begin a new layer. In this manner, a 3D-object may be produced out of the thermoplastic material.

Some print heads may utilize multiple extruders to deposit different thermoplastic materials or a combination thereof. The ability to extrude different thermoplastic materials may allow selection and use of different thermoplastic materials based on desired physical properties and/or geometry of the 3D-object. The different thermoplastic materials may also be selected based on intended applications. For example, some print heads may utilize a pair of extruders that may selectively extrude a part material and a support material.

Conventional print heads utilizing multiple extruders require a separate motor and a corresponding drive for feeding the thermoplastic materials to each heated extruder. This may significantly increase the weight and size of the print head with each additional extruder, thereby degrading the overall performance of the print head and an additive manufacturing system utilizing the print head.

Some existing additive manufacturing systems may include feeders disposed outside the print head, for example, on a body of the additive manufacturing system. Such an arrangement may be complex in construction and reduces efficiency of the system since the feeders would be away from the print head. Current systems also use feeders that are typically disposed on the print head.

U.S. Pat. No. 7,604,470 discloses an extrusion head for an extrusion-based layered manufacturing system utilizing a single drive motor. The system includes an assembly positionable between a first state and a second state using a toggle-plate assembly. A first extrusion line engages a drive wheel while the assembly is positioned in the first state, and a second extrusion line engages the drive wheel while the assembly is positioned in the second state. The system may selectively extrude a pair of materials with the use of the single drive motor and the assembly. However, a single drive wheel is used for selectively engaging and feeding two different filaments. Therefore, a rotational direction of the motor needs to be changed when switching between the two filaments. Moreover, two separate wheels have to be moved relative to the drive wheel during switching between the two filaments. This may increase a complexity of the manufacturing system, thereby adversely impacting its reliability and cost.

SUMMARY OF THE INVENTION

The aim of the present invention is to provide a new and improved dual filament feeder assembly for an additive manufacturing system and a dual extruder print head including the dual filament feeder assembly. The dual extruder print head may selectively extrude two materials while utilizing a single motor.

According to a first aspect of the present invention, there is provided a dual filament feeder assembly for an additive manufacturing system. The dual filament feeder assembly comprises a drive wheel. The dual filament feeder assembly further comprises a drive shaft connected to the drive wheel. The dual filament feeder assembly further comprises a first feeder wheel rotatably arranged around the drive shaft at a first side of the drive wheel. The dual filament feeder assembly further comprises a second feeder wheel rotatably arranged around the drive shaft at a second side of the drive wheel opposite to the first side. The dual filament feeder assembly further comprises a coupling member arranged to selectively couple the drive wheel with one of the first feeder wheel and the second feeder wheel. The dual filament feeder assembly further comprises a shifting member arranged to move the coupling member between a first position and a second position. The coupling member drivably couples the drive wheel with the first feeder wheel in the first position of the coupling member. The coupling member drivably couples the drive wheel with the second feeder wheel in the second position of the coupling member.

The dual filament feeder assembly of the present invention may allow selective feeding of two filaments based on the first position and the second position of the coupling member. Use of the shifting member to move the coupling member between the first position and the second position may allow selective coupling of the drive wheel with the first feeder wheel or the second feeder wheel. This may allow a single motor drive to be used, thereby reducing a weight and a size of the dual filament feeder assembly. The shifting member may be actuated mechanically, electrically, pneumatically, hydraulically, or any combinations thereof. Since only the coupling member is moved between the first position and the second position, instead of moving the first feeder wheel and the second feeder wheel, the dual filament feeder assembly of the present invention may have a simple design with improved performance and reliability. Moreover, a change in a rotational direction of the drive wheel may not be required during switching between the two filaments, leading to a simpler design and operation of the dual filament feeder assembly.

In an embodiment, the coupling member comprises a ring with a plurality of inner splines arranged on an inner surface of the ring. The first feeder wheel comprises a first splined portion that is at least partially engaged with the plurality of inner splines of the coupling member in the first position of the coupling member. The second feeder wheel comprises a second splined portion that is at least partially engaged with the plurality of inner splines of the coupling member in the second position of the coupling member. The drive wheel comprises a plurality of outer splines slidably and at least partially engaging with the plurality of inner splines of the coupling member. The coupling member is slidable over the drive wheel between the first position and the second position. The plurality of inner splines of the coupling member may always be at least partially engaged with the plurality of outer splines of the drive wheel. The inner splines and the outer splines may result in a reliable engagement between the coupling member and the drive wheel. Similarly, the inner splines and the first splined portion may result in a reliable engagement between the coupling member and the first feeder wheel while the coupling member is in the first position. Further, the inner splines and the second splined portion may result in a reliable engagement between the coupling member and the second feeder wheel while the coupling member is in the second position.

In an embodiment, the first feeder wheel further comprises a first roller portion for contact with a first filament. The second feeder wheel further comprises a second roller portion for contact with a second filament. The first and second roller portions may improve engagement of the first and second feeder wheels with the first and second filaments, respectively.

In an embodiment, the dual filament feeder assembly further comprises a support shaft arranged in parallel relative to the drive shaft. The shifting member comprises a sliding portion that receives the support shaft therethrough, such that the shifting member is slidable along the support shaft. The support shaft may enable the shifting member to move linearly and substantially parallel to the drive shaft.

In an embodiment, the coupling member further comprises a pair of end flanges. The shifting member further comprises an actuating portion extending from the sliding portion and received at least partially between the pair of end flanges of the coupling member, such that a linear movement of the shifting member along the support shaft causes a corresponding linear movement of the coupling member along the drive shaft. The pair of end flanges may restrict relative linear movement between the shifting member and the coupling member. Therefore, coupling between the shifting member and the coupling member may be improved. Further, the coupling member may also provide a bearing surface to allow relative rotational movement between the coupling member and the shifting member.

In an embodiment, the dual filament feeder assembly further comprises a mechanical switch that comprises an arm engaged with the shifting member, such that an actuation of the mechanical switch causes a linear movement of the shifting member and a corresponding movement of the coupling member between the first position and the second position. The mechanical switch may allow actuation of the shifting member and the coupling member based on a desired operation of the additive manufacturing system.

In an embodiment, the mechanical switch is rotatable about a vertical rotation axis. A rotation of the mechanical switch may result in the linear movement of the shifting member and the corresponding movement of the coupling member between the first position and the second position.

In an embodiment, the shifting member further comprises an engaging portion. The engaging portion comprises a lower surface, a first side surface extending from the lower surface, and a second side surface extending from the lower surface and spaced apart from the first side surface. The lower surface, the first side surface and the second side surface define a channel therebetween. The arm of the mechanical switch is at least partially and movably received within the channel. The channel and the arm may enable reliable engagement between the shifting member and the mechanical switch.

In an embodiment, the arm of the mechanical switch comprises an elongate portion and an end portion inclined to the elongate portion. The end portion is arranged to slide relative to the lower surface of the engaging portion prior to selectively engaging with one of the first side surface and the second side surface. The sliding movement of the end portion relative to the lower surface may allow a certain degree of play between the mechanical switch and the shifting member. Such play may improve an engagement between the coupling member and the first feeder wheel or the second feeder wheel.

In an embodiment, the end portion is disc-shaped. The disc-shaped end portion may allow smooth movement of the shifting member based on the movement of the mechanical switch. The disc-shaped end portion may also have less area of contact leading to reduced wear.

In an embodiment, the mechanical switch further comprises a curved wedge member configured to rotate about the vertical rotation axis. The curved wedge member is arranged to receive an upper part of a cylindrical extruder having a flange at a top end of the cylindrical extruder. The curved wedge member may allow the mechanical switch to move the cylindrical extruder based on a rotation about the vertical rotation axis. In this way, the mechanical switch both controls the suitable lifting of one of the extruders and at the same time, activates the driving of the correct feeder wheels.

In an embodiment, the dual filament feeder assembly further comprises an electrical motor for driving the drive shaft. The single electrical motor may selectively drive the first feeder wheel or the second feeder wheel via the drive wheel.

According to a second aspect, there is provided a dual extruder print head for an additive manufacturing system. The dual extruder print head comprises the dual filament feeder assembly of the first aspect. The print head may have reduced weight and size, while allowing dispensing of two filaments.

In an embodiment, the dual extruder print head further comprises a first dock for installing a first extruder that, at least in use, receives a first filament from the first feeder wheel, and a second dock for installing a second extruder that, at least in use, receives a second filament from the second feeder wheel. In some cases, the first and second extruders may be detachably received in the first and second docks, respectively, for facilitating replacement and/or maintenance.

In an embodiment, the mechanical switch is coupled with the second extruder. The second extruder is in a raised position when the coupling member is in the first position. The second extruder is in a lowered position when the coupling member is in the second position. The single mechanical switch may therefore perform two operations simultaneously: a) actuating the coupling member between the first and second positions to switch between the two filaments; b) moving the second extruder between the raised position and the lowered position. Thus, the dual extruder print head including the mechanical switch may have a simpler design and operation. The first extruder may be active, and the second extruder may be idle in the raised position of the second extruder. Conversely, the second extruder may be active, and the first extruder may be idle in the lowered position of the second extruder. The raised and lowered positions of the second extruder may minimize interference between the first and second extruders when one of them is active and the other is idle.

According to a third aspect, there is provided an additive manufacturing system including the dual extruder print head of the second aspect. The additive manufacturing system may have an improved overall performance.

BRIEF DESCRIPTION OF THE DRAWINGS

These and other aspects of the invention are apparent from and will be elucidated with reference to the embodiments described hereinafter. In the drawings, FIG. 1A schematically shows a perspective view of a dual extruder print head for an additive manufacturing system according to an embodiment of the present invention;

FIG. 4A schematically shows a perspective view of a part of the dual filament feeder assembly of FIG. 2 in a first position of a coupling member according to an embodiment of the present invention;

FIG. 4B schematically shows a perspective view of a part of the dual filament feeder assembly of FIG. 2 in a second position of the coupling member according to an embodiment of the present invention;

FIG. 4C schematically shows a perspective view of a part of the dual filament feeder assembly of FIG. 2 with the coupling member and a shifting member omitted;

FIG. 5A schematically shows a perspective view of the coupling member, a drive wheel, and the shifting member of the dual filament feeder assembly according to an embodiment of the present invention;

FIG. 5B schematically shows an exploded view of the coupling member, the drive wheel, and the shifting member of FIG. 5A;

FIG. 12 schematically shows a perspective view of the dual extruder print head disposed inside a chamber of the additive manufacturing system of FIG. 11 according to an embodiment of the present invention.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1B:
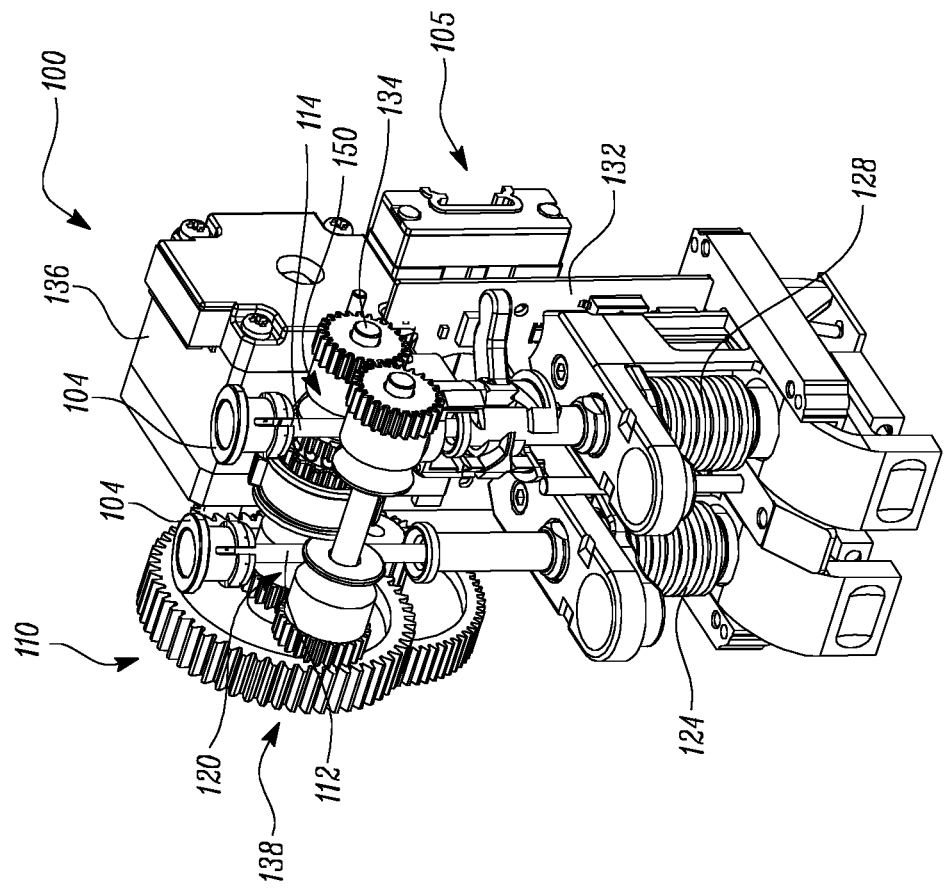
FIG. 1B schematically shows a perspective view of the dual extruder print head of FIG. 1A with a housing of the dual extruder print head omitted according to an embodiment of the present invention.
Figure 1A:
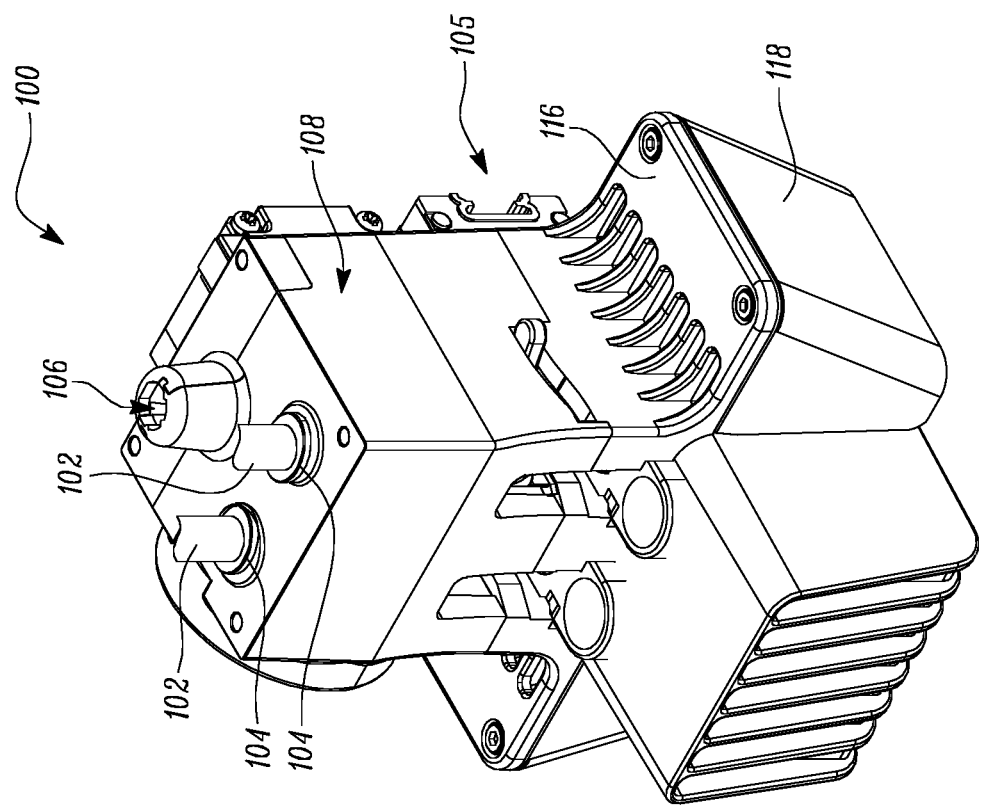

FIG. 1A schematically shows an embodiment of a dual extruder print head 100 for an additive manufacturing system. The dual extruder print head 100 may build parts/components in a layer-by-layer manner from a software model, such as a computer-aided design (CAD) model. In some embodiments, the dual extruder print head 100 may comprise a pair of extruders (not shown) that may receive a consumable material (e.g., a filament). As used herein, the term "consumable material" collectively refers to one or more consumable materials received by the dual extruder print head 100. Each extruder may receive a corresponding consumable material. The consumable material may be melted by the pair of extruders and the molten consumable material may then be utilized to produce the parts/components.

The consumable material may be provided through a pair of guide tubes 102 corresponding to the pair of extruders. The guide tubes 102 may be utilized to support and guide the consumable material. In some embodiments, the dual extruder print head 100 may utilize other structures for guiding and supporting the consumable material. The dual extruder print head 100 further comprises adaptors 104 for receiving the respective guide tubes 102 and the associated consumable material. The dual extruder print head 100 may further comprise an inlet 106 for supplying power and control signals. In an example, power and control signal may be supplied to the dual extruder print head 100 using a cord running through the inlet 106.

The dual extruder print head 100 further comprises a housing 108. The housing 108 comprises an upper housing portion 116 and a lower housing portion 118 removably coupled to the upper housing portion 116. In some embodiments, the upper housing portion 116 may further comprise sub-housing portions that may facilitate access to internal components.

The dual extruder print head 100 further comprises a rail carriage 105 disposed on the housing 108. Specifically, the rail carriage 105 is disposed at a rear portion of the housing 108. The rail carriage 105 allows the dual extruder print head 100 to be mounted on a guide rail 408 (shown in FIG. 12) for appropriate movement of the dual extruder print head 100 in working directions.

FIG. 1B schematically shows an embodiment of the dual extruder print head 100 with the housing 108 omitted. The dual extruder print head 100 may further comprise a dual filament feeder assembly 110 for dispensing a first filament 112 and a second filament 114. The dual filament feeder assembly 110 comprises a first feeder 120 for receiving the first filament 112 and a second feeder 150 for receiving the second filament 114. The dual extruder print head 100 further comprises a first dock for installing a first extruder 124 that, at least in use, receives the first filament 112 from the first feeder 120, and a second dock for installing a second extruder 128 that, at least in use, receives the second filament 114 from the second feeder 150. In some embodiments, the first dock and the second dock may detachably receive the first extruder 124 and the second extruder 128, respectively, in order to allow replacement and/or maintenance. The housing 108 (shown in FIG. 1A) at least partially encloses the dual filament feeder assembly 110, the first extruder 124, and the second extruder 128 therein.

The first and second filaments 112, 114 may be provided through the guide tubes 102 (shown in FIG. 1A). In some embodiments, one of the first and second filaments 112, 114 may comprise a consumable part material while the other filament may comprise a consumable support material. In some embodiments, the consumable part material and the consumable support material may differ in material properties. In some cases, the first filament 112 may comprise a thermoplastic polymer, such as Acrylonitrile Butadiene Styrene (ABS). Further, the second filament 114 may comprise a water-soluble material, such as Polyvinyl alcohol (PVA). In alternative embodiments, both the consumable part material and the consumable support material may be similar to each other. In some other embodiments, the first and second filaments 112, 114 may comprise a similar build material with different cosmetic or aesthetic properties, such as different colours.

The dual filament feeder assembly 110 may engage with the consumable material (the first and second filaments 112, 114) and draw successive segments of the consumable material to be fed to the first extruder 124 or the second extruder 128. In some embodiments, the dual filament feeder assembly 110 may engage with the first and second filament 112, 114 without significantly deforming the filaments but such that the dual filament feeder assembly 110 feeds the filaments into the dual extruder print head 100 with a desired force.

In some embodiments, during a build operation, the successive segments of the consumable material may be heated by the first and second extruders 124, 128. Further, the melted consumable material may then be released from extruder tips (not shown) of the first and second extruders 124, 128 and deposited in a layer-wise pattern to produce parts/components. In some embodiments, the dual filament feeder assembly 110 may selectively dispense only one of the first and second filaments 112, 114 at a time, such that only one of the first and second extruders 124, 128 may be operational at a time during the build operation.

The first and second feeders 120, 150 are activated by a drive shaft 134. The dual filament feeder assembly 110 further comprises an electrical motor 136 for driving the drive shaft 134. The electrical motor 136 may rotate the drive shaft 134 through one or more gears 138. During operation, the electrical motor 136 may selectively drive the first feeder 120 or the second feeder 150. In some embodiments, the first feeder 120 and the second feeder 150 may be disposed adjacent to each other. In some embodiments, the first feeder 120 and the second feeder 150 may dispense the first filament 112 and the second filament 114 to the first extruder 124 and the second extruder 128, respectively.

The dual extruder print head 100 may further comprise an electronic assembly 132 that monitors and/or controls the operation of the dual extruder print head 100. In an example, the electronic assembly 132 may comprise a circuit board with printed circuits/components mounted thereon.

In some embodiments, separate heating units may be provided in heating engagement with the first and second extruders 124, 128 so as to heat the first and second filaments 112, 114 as the first and second filaments 112, 114 travel through the first and second extruders 124, 128, respectively, during operation of the additive manufacturing system. The heating units may provide heat to the respective first and second extruders 124, 128 for obtaining set point operating temperature(s) required to generate a desired thermal gradient for melting the consumable material. In some embodiments, the first and second extruders 124, 128 may be cooled down from their respective operating temperatures after use to prevent the consumable material from thermally degrading, oozing, or dripping out. The heating and/or cooling of the first and second extruders 124, 128 may be monitored by the electronic assembly 132 or by another controlling system arranged in the printing system.

Figure 2:
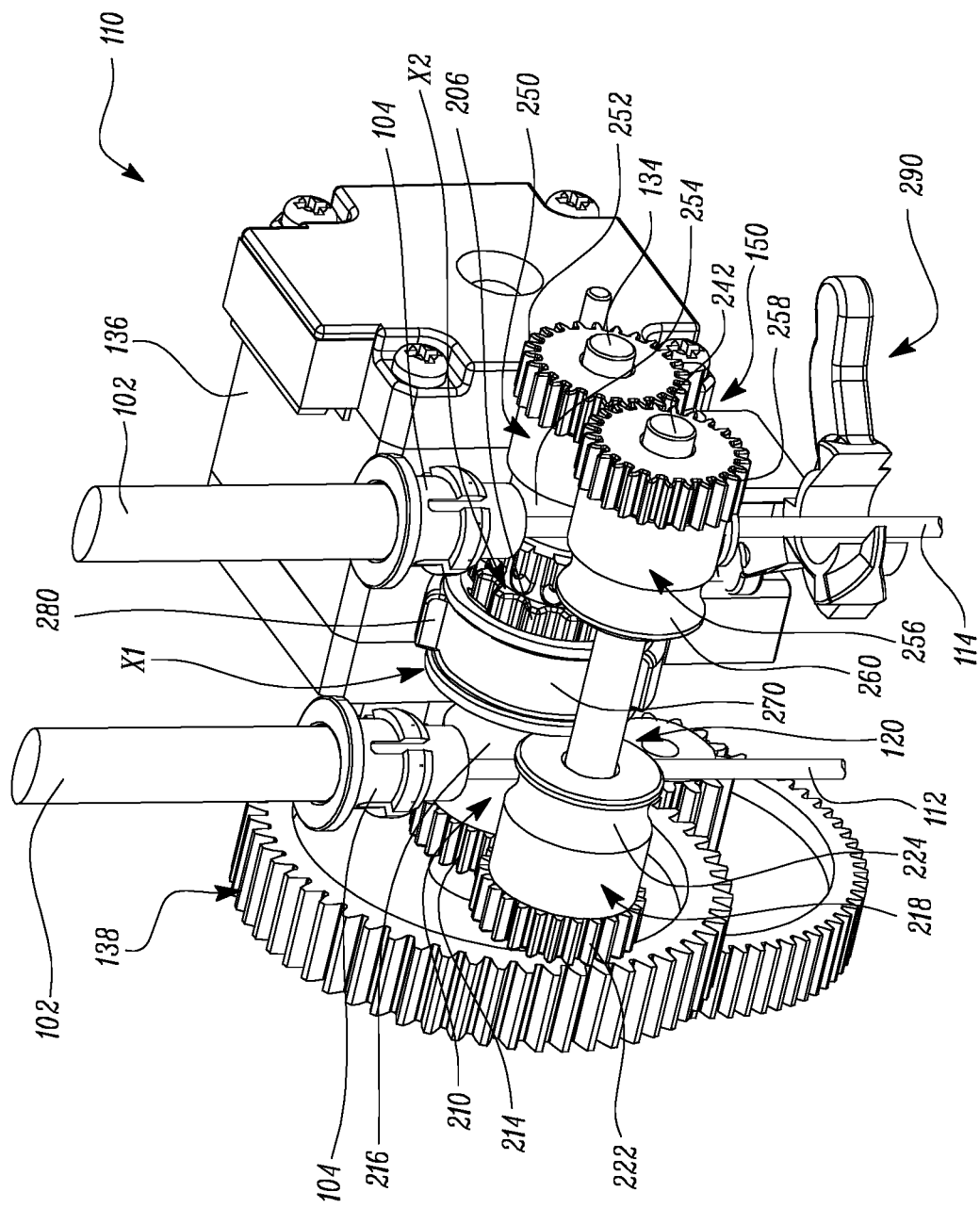
FIG. 2 schematically shows a perspective view of a dual filament feeder assembly for an additive manufacturing system according to an embodiment of the present invention.

FIG. 2 schematically shows an embodiment of the dual filament feeder assembly 110 for an additive manufacturing system. The dual filament feeder assembly 110 may be a part of a print head (e.g., the dual extruder print head 100 shown in FIGS. 1A and 1B) of the additive manufacturing system. The dual filament feeder assembly 110 comprises a drive wheel 206. The dual filament feeder assembly 110 further comprises the drive shaft 134 connected to the drive wheel 206. The dual filament feeder assembly 110 further comprises the electrical motor 136 and the one or more gears 138 for driving the drive shaft 134. The guide tubes 102 may provide the first filament 112 and the second filament 114 to the dual filament feeder assembly 110. The guide tubes 102 may be supported by the adaptors 104 at least partially disposed in a housing (e.g., the housing 108 shown in FIG. 1A) of the print head.

The dual filament feeder assembly 110 further comprises a first feeder wheel 210 rotatably arranged around the drive shaft 134 at a first side X1 (also shown in FIGS. 3A and 3B) of the drive wheel 206. Specifically, the first feeder 120 comprises the first feeder wheel 210. As used herein, the term "rotatably arranged" refers to configurations in which a first element may be directly coupled to a second element in a rotatable manner, for example, in a manner that allows for rotation of the first element with respect to the second element or vice versa. The term may also comprise configurations in which the first element may be indirectly coupled to a second element in a rotatable manner by affixing the first element to intermediate member(s) (e.g., bearings) that in turn are affixed to the second element.

In some embodiments, the first feeder wheel 210 may be selectively driven by the electrical motor 136. The first feeder wheel 210 may comprise a first gear portion 214. The first feeder 120 further comprises a third feeder wheel 218 having a third gear portion 222. The first gear portion 214 of the first feeder wheel 210 meshes with and drives the third gear portion 222 of the third feeder wheel 218. In some other embodiments, the first feeder wheel 210 and the third feeder wheel 218 may engage with each other by any other suitable means, such as a friction coupling.

The first feeder wheel 210 further comprises a first roller portion 216 for contacting the first filament 112. The third feeder wheel 218 further comprises a third roller portion 224 that contacts the first filament 112 together with the first roller portion 216. The first filament 112 may be received between the first roller portion 216 of the first feeder wheel 210 and the third roller portion 224 of the third feeder wheel 218.

The dual filament feeder assembly 110 further comprises a second feeder wheel 250 rotatably arranged around the drive shaft 134 at a second side X2 (also shown in FIGS. 3A and 3B) of the drive wheel 206 opposite to the first side X1.

Specifically, the second feeder 150 comprises the second feeder wheel 250. In some embodiments, the second feeder wheel 250 may be selectively driven by the electrical motor 136. The second feeder wheel 250 comprises a second gear portion 252. The second feeder 150 further comprises a fourth feeder wheel 256 having a fourth gear portion 258. The second gear portion 252 of the second feeder wheel 250 meshes with and drives the fourth gear portion 258 of the fourth feeder wheel 256. In some other embodiments, the second feeder wheel 250 and the fourth feeder wheel 256 may engage with each other by any other suitable means, such as a friction coupling.

The second feeder wheel 250 further comprises a second roller portion 254 for contacting the second filament 114. The fourth feeder wheel 256 further comprises a fourth roller portion 260 that contacts the second filament 114 together with the second roller portion 254. The second filament 114 may be received between the second roller portion 254 of the second feeder wheel 250 and the fourth roller portion 260 of the fourth feeder wheel 256. The third feeder wheel 218 and the fourth feeder wheel 256 are arranged around an idle shaft 242. In some embodiments, the third feeder wheel 218 and the fourth feeder wheel 256 are rotatably arranged around the idle shaft 242, such that the third feeder wheel 218 and the fourth feeder wheel 256 rotate relative to the idle shaft 242. In some other embodiments, the idle shaft 242 may rotate along with the third feeder wheel 218 and the fourth feeder wheel 256.

In some embodiments, the electrical motor 136 may be arranged to selectively drive one of the first feeder wheel 210 and the second feeder wheel 250. It should be appreciated that any type of prime mover may be utilized for driving the first feeder wheel 210 and/or the second feeder wheel 250 without departing from the scope of this disclosure.

The dual filament feeder assembly 110 further comprises a coupling member 270 arranged to selectively couple the drive wheel 206 with one of the first feeder wheel 210 and the second feeder wheel 250. Specifically, the electrical motor 136 may be arranged to drive either the first feeder wheel 210 or the second feeder wheel 250 based on selective coupling of the drive wheel 206 with the corresponding first feeder wheel 210 or the second feeder wheel 250. As used herein, the term "selectively couple" means removably coupled wherein a first element may be coupled to a second element under one or more conditions and the first element may be detached from the second element under one or more conditions.

The dual filament feeder assembly 110 further comprises a shifting member 280 arranged to move the coupling member 270 between a first position P1 (shown in FIG. 4A) and a second position P2 (shown in FIG. 4B). In some embodiments, the shifting member 280 may be coupled to the coupling member 270. Further, in some embodiments, the shifting member 280 may be coupled to the coupling member 270, such that the coupling member 270 may be arranged to move along with the shifting member 280. In some embodiments, the shifting member 280 may be arranged to move the coupling member 270 for selectively coupling the drive wheel 206 with one of the first feeder wheel 210 and the second feeder wheel 250.

The dual filament feeder assembly 110 further comprises a mechanical switch 290 engaged with the shifting member 280. In some embodiments, the mechanical switch 290 may move the shifting member 280 to allow the shifting member 280 to move the coupling member 270 between the first position P1 and the second position P2. The coupling member 270 drivably couples the drive wheel 206 with the first feeder wheel 210 in the first position P1 of the coupling member 270. The coupling member 270 drivably couples the drive wheel 206 with the second feeder wheel 250 in the second position P2 of the coupling member 270. When the coupling member 270 drivably couples the drive wheel 206 with one of the first feeder wheel 210 and the second feeder wheel 250, the rotation of the drive wheel 206 may be transmitted to the first feeder wheel 210 or the second feeder wheel 250.

As used herein, the term "drivably couple" refers to a state in which two rotary elements are coupled to each other in such a way that allows transfer of a drive force, which comprises a state in which the two rotary elements are coupled to each other to rotate together with each other, or a state in which the two rotary elements are coupled to each other via one or two or more transmission members in such a way that allows transfer of the drive force. Examples of such transmission members may comprise various members that transfer rotation at a substantially equal speed or a changed speed, such as a gear mechanism, a belt mechanism, and a chain mechanism. Additional examples of such transmission members may comprise engagement elements that selectively transfer rotation and the drive force, such as a friction engagement element and a meshing-type engagement element.

In some embodiments, the mechanical switch 290 may rotate between a first switch position S1 (shown in FIG. 4A) and a second switch position S2 (shown in FIG. 4B), such that the shifting member 280 moves the coupling member 270 to couple the drive wheel 206 with one of the first feeder wheel 210 and the second feeder wheel 250. The electrical motor 136 may drive the drive wheel 206 through the drive shaft 134 and the one or more gears 138. The first switch position S1 may correspond to the first position P1 of the coupling member 270 and the second switch position S2 may correspond to the second position P2 of the coupling member 270. In some embodiments, the mechanical switch 290 may be actuated automatically. However, in some embodiments, the mechanical switch 290 may be manipulated manually as well.

The selective coupling of the first feeder wheel 210 or the second feeder wheel 250 with the electrical motor 136 allows either the first filament 112 or the second filament 114 to be dispensed accordingly based on the position of the mechanical switch 290 and the coupling member 270. Further, referring to FIGS. 1A and 1B, the dual extruder print head 100 may extrude either the first filament 112 or the second filament 114 after being processed by the first extruder 124 or the second extruder 128, respectively.

It should be understood that the selective coupling of the electrical motor 136 with the first feeder wheel 210 or the second feeder wheel 250 by the coupling member 270 through movement of the mechanical switch 290 is incorporated in the present disclosure by way of example only, and the actuation of the coupling member 270 for selective engagement of the electrical motor 136 with the first feeder wheel 210 or the second feeder wheel 250 may be realized by any other means as well without limiting the scope of the present disclosure. For example, the mechanical switch 290 may be replaced with any suitable electrical actuator, hydraulic actuator, pneumatic actuator, mechanical actuator, and/or the like.

Figure 3B:
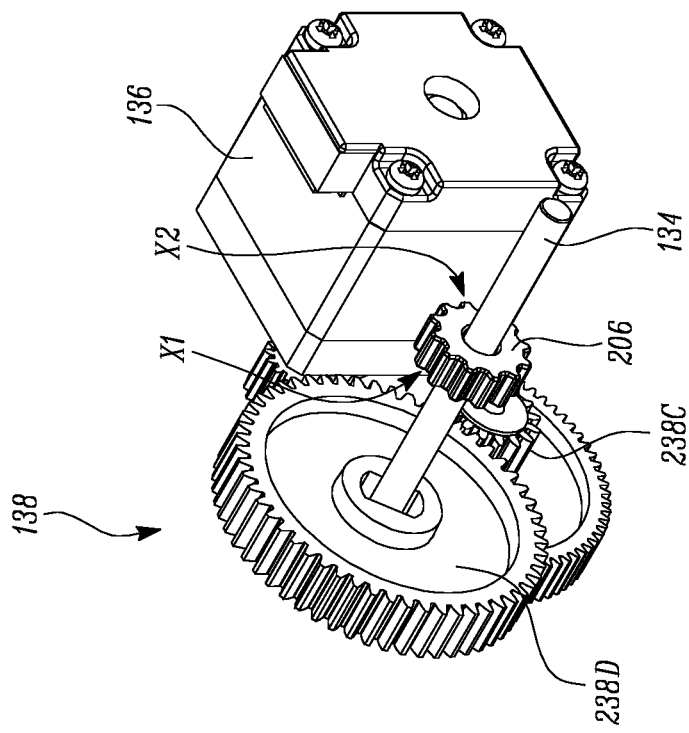
FIGS. 3A and 3B schematically show a left perspective view and a right perspective view, respectively, of an electrical motor and one or more gears of the dual filament feeder assembly of FIG. 2 according to an embodiment of the present invention.
Figure 3A:
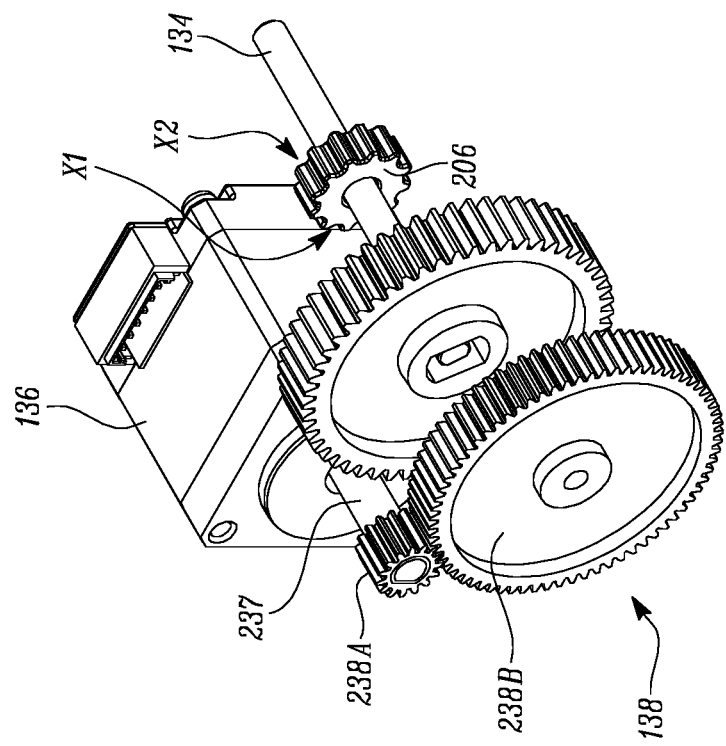

FIGS. 3A and 3B schematically show a left perspective view and a right perspective view, respectively, of an embodiment of the electrical motor 136 and the one or more gears 138 of the dual filament feeder assembly 110. Referring now to the illustrated embodiment of FIGS. 3A and 3B, the one or more gears 138 comprise a first gear 238A, a second gear 238B meshed with the first gear 238A, a third gear 238C, and a fourth gear 238D meshed with the third gear 238C. The first gear 238A is mounted on a motor shaft 237 of the electrical motor 136 and is driven by the electrical motor 136. The first gear 238A drives the second gear 238B. The third gear 238C is coupled to the second gear 238B, such that the second and third gears 238B, 238C rotate together at a same speed. In some embodiments, the second and third gears 238B, 238C may be fixedly coupled with each other. The third gear 238C drives the fourth gear 238D. The fourth gear 238D is coupled to the drive shaft 134, such that the fourth gear 238D and the drive shaft 134 rotate together at a same speed. The first and second gears 238A, 238B may form a first reduction stage, while the second and third gears 238C, 238D may form a second reduction stage. The first, second, third and fourth gears 238A-D may reduce a rotational speed provided by the electrical motor 136 to a desired speed of the drive shaft 134.

The electrical motor 136 may drive the drive wheel 206 through the one or more gears 138. Specifically, the electrical motor 136 may rotate the drive shaft 134 that drives the drive wheel 206. In some embodiments, the drive wheel 206 may be fixedly or removably coupled with the drive shaft 134, for example, through welding, interference fit or keyed coupling. In the examples shown in FIGS. 3A and 3B, the one or more gears 138 are illustrated as spur gears, however, any other suitable type of gear may be utilized without limiting the scope of the present disclosure. Further, in some embodiments, the one or more gears 138 may comprise one or more idle gears as well.

In some embodiments, the electrical motor 136 may be monitored and controlled by a controller (not shown) during operation of the additive manufacturing system. For example, the controller may control stop, start and a change in direction of rotation of the electrical motor 136 when required. Referring now to FIGS. 2, 3A-3B, in some embodiments, the electrical motor 136 may be momentarily stopped before the coupling member 270 drivably couples the drive wheel 206 with the second feeder wheel 250 from the first feeder wheel 210 and vice versa. Further, in some embodiments, the electrical motor 136 may first operate in a reverse direction before the coupling member 270 shifts between the first position P1 (shown in FIG. 4A) and the second position P2 (shown in FIG. 4B) for substantially pulling a corresponding filament (e.g., the first filament 112 or the second filament 114) out from a corresponding extruder (e.g., the first extruder 124 or the second extruder 128). However, the reverse operation of the electrical motor 136 may be momentary or for a predetermined angle/number of rotations of the motor shaft 237.

FIGS. 3A and 3B further illustrate the first side X1 of the drive wheel 206 and the second side X2 of the drive wheel 206. The first side X1 and the second side X2 are opposing sides that correspond to opposing axial faces of the drive wheel 206. Referring to FIGS. 2, 3A-3B, the first feeder wheel 210 and the second feeder wheel 250 are disposed at the first side X1 and the second side X2, respectively, of the drive wheel 206, such that the drive wheel 206 is disposed between the first and second feeder wheels 210, 250 along a length of the drive shaft 134.

FIG. 4A illustrates the dual filament feeder assembly 110 in the first position P1 of the coupling member 270. The first position P1 of the coupling member 270 may correspond to the first switch position S1 of the mechanical switch 290. In the first position P1 of the coupling member 270, the coupling member 270 drivably couples the drive wheel 206 with the first feeder wheel 210, such that power from the electrical motor 136 (shown in FIG. 2) may be transmitted to the first feeder wheel 210. FIG. 4B schematically shows the dual filament feeder assembly 110 in the second position P2 of the coupling member 270. The second position P2 of the coupling member 270 may correspond to the second switch position S2 of the mechanical switch 290. In the second position P2 of the coupling member 270, the coupling member 270 drivably couples the drive wheel 206 with the second feeder wheel 250 such that power from the electrical motor 136 may be transmitted to the second feeder wheel 250. Some of the parts of the dual filament feeder assembly 110 in FIGS. 4A and 4B are not shown for clarity.

Referring now to FIGS. 4A and 4B, the dual filament feeder assembly 110 comprises the first feeder wheel 210 and the second feeder wheel 250 rotatably arranged around the drive shaft 134. The dual filament feeder assembly 110 further comprises the third feeder wheel 218 and the fourth feeder wheel 256 arranged around the idle shaft 242. The dual filament feeder assembly 110 further comprises the coupling member 270 for selectively coupling the drive wheel 206 (shown in FIG. 4B) with the first feeder wheel 210 or the second feeder wheel 250. In the illustrated embodiment, the coupling member 270 comprises a ring 272 (shown in FIG. 5B) with a plurality of inner splines 274 arranged on an inner surface 276 of the ring 272. The dual filament feeder assembly 110 further comprises the drive wheel 206 coupled to the drive shaft 134 and receiving power from the electrical motor 136 through the one or more gears 138 (shown in FIGS. 1B, 3A-3B).

The first feeder wheel 210 and the second feeder wheel 250 may receive the drive shaft 134 therethrough, such that each of the first feeder wheel 210 and the second feeder wheel 250 may rotate relative to the drive shaft 134. In some embodiments, the first feeder wheel 210 and the second feeder wheel 250 may be mounted on the drive shaft 134 through any suitable bearing, such as a roller bearing or a journal bearing. The third feeder wheel 218 and the fourth feeder wheel 256 may receive the idle shaft 242 therethrough, such that each of the third feeder wheel 218 and the fourth feeder wheel 256 may rotate relative to the idle shaft 242. In some embodiments, the third feeder wheel 218 and the fourth feeder wheel 256 may be mounted on the idle shaft 242 through any suitable bearing, such as a roller bearing or a journal bearing.

The dual filament feeder assembly 110 further comprises the shifting member 280 arranged to move the coupling member 270 between the first position P1 (shown in FIG. 4A) and the second position P2 (shown in FIG. 4B). The dual filament feeder assembly 110 further comprises a support shaft 244 arranged in parallel relative to the drive shaft 134. The shifting member 280 comprises a sliding portion 282 (shown in FIG. 5A) that receives the support shaft 244 therethrough, such that the shifting member 280 may be slidable along the support shaft 244. Further, the sliding portion 282 may slide relative to the support shaft 244 along a longitudinal axis A. The longitudinal axis A is defined along a length of the support shaft 244. Further, the drive shaft 134 and the idle shaft 242 may be disposed substantially parallel to the longitudinal axis A. The shifting member 280 may be coupled to the coupling member 270, such that the coupling member 270 also moves along the drive shaft 134 with the movement of the shifting member 280 along the longitudinal axis A. In some embodiments, the shifting member 280 may be mounted on the support shaft 244 through any suitable bearing, such as a roller bearing or a journal bearing.

The shifting member 280 can move the coupling member 270 between the first position P1 and the second position P2. In other words, the shifting member 280 can move the coupling member 270 from the first position P1 to the second position P2, and back from the second position P2 to the first position P1. A linear movement of the coupling member 270 from the first position P1 to the second position P2 along the longitudinal axis A is indicated by an arrow A1 in FIG. 4A. Further, a linear movement of the coupling member 270 from the second position P2 to the first position P1 along the longitudinal axis A is indicated by an arrow A2 in FIG. 4B.

The mechanical switch 290 can move the shifting member 280 which in turn moves the coupling member 270 between the first position P1 and the second position P2. The mechanical switch 290 can rotate between the first switch position S1 and the second switch position S2. In other words, the mechanical switch 290 can rotate from the first switch position S1 to the second switch position S2, and back from the second switch position S2 to the first switch position S1. A rotational movement of the mechanical switch 290 from the first switch position S1 to the second switch position S2 is indicated by an arrow A3 in FIG. 4A. Further, a rotational movement of the mechanical switch 290 from the second switch position S2 to the first switch position S1 is indicated by an arrow A4 in FIG. 4B. The coupling member 270 is in the first position P1 when the mechanical switch 290 is in the first switch position S1. Conversely, the coupling member 270 is in the second position P2 when the mechanical switch 290 is in the second switch position S2.

FIG. 4C schematically shows the dual filament feeder assembly 110 where the coupling member 270 and the shifting member 280 are omitted. Referring now to FIGS. 4A-4C, the drive wheel 206 may comprise a plurality of outer splines 208 slidably and at least partially engaging with the plurality of inner splines 274 (shown in FIG. 5B) of the coupling member 270. The coupling member 270 may be slidable over the drive wheel 206 between the first position P1 and the second position P2. Further, the coupling member 270 may be slidable relative to the drive wheel 206 for selectively coupling the drive wheel 206 with one of the first feeder wheel 210 and the second feeder wheel 250. The drive wheel 206 is disposed between the first feeder wheel 210 and the second feeder wheel 250. Further, each of the first feeder wheel 210, the drive wheel 206, and the second feeder wheel 250 are rotatably arranged around the drive shaft 134. In some embodiment, the plurality of inner splines 274 (shown in FIG. 5B) of the coupling member 270 may be permanently and at least partially engaged with the plurality of outer splines 208 of the drive wheel 206. In other words, the plurality of inner splines 274 may always be at least partially engaged with the plurality of outer splines 208 irrespective of a position of the coupling member 270.

The first feeder wheel 210 further comprises a first splined portion 226 that may be at least partially engaged with the plurality of inner splines 274 (shown in FIG. 5B) of the coupling member 270 in the first position P1 (shown in FIG. 4A) of the coupling member 270. The first roller portion 216 of the first feeder wheel 210 is disposed between the first gear portion 214 and the first splined portion 226.

In the first position P1 of the coupling member 270, the coupling member 270 may couple the first splined portion 226 with the plurality of outer splines 208 of the drive wheel 206, such that the rotation of the drive wheel 206 may be transmitted to the first feeder wheel 210 through the coupling member 270. Thus, the coupling member 270 drivably couples the drive wheel 206 with the first feeder wheel 210 in the first position P1 of the coupling member 270. The first feeder wheel 210 and the drive wheel 206 may then rotate at substantially the same speed. In other words, power from the electrical motor 136 may be transmitted to the first feeder wheel 210 through the one or more gears 138, the drive shaft 134, the drive wheel 206 and the coupling member 270. In the first position P1 of the coupling member 270, the mechanical switch 290 is in the first switch position S1.

The first feeder wheel 210 may drive the third feeder wheel 218. The first filament 112 may then be pulled between the first roller portion 216 of the first feeder wheel 210 and the third roller portion 224 of the third feeder wheel 218. Hence, the first filament 112 may be dispensed by the dual filament feeder assembly 110 as the electrical motor 136 drives the first feeder wheel 210. Each of the first roller portion 216 and the third roller portion 224 may be at least partially concave. The concave surface may conform with an outer surface of the first filament 112 and may allow appropriate engagement of the first filament 112 with the first roller portion 216 and the third roller portion 224.

The second feeder wheel 250 further comprises a second splined portion 262 that may be at least partially engaged with the plurality of inner splines 274 (shown in FIG. 5B) of the coupling member 270 in the second position P2 of the coupling member 270 (shown in FIG. 4B). The second roller portion 254 of the second feeder wheel 250 is disposed between the second gear portion 252 and the second splined portion 262.

In the second position P2 of the coupling member 270, the coupling member 270 may couple the second splined portion 262 with the plurality of outer splines 208 of the drive wheel 206, such that the rotation of the drive wheel 206 may be transmitted to the second feeder wheel 250 through the coupling member 270. Thus, the coupling member 270 drivably couples the drive wheel 206 with the second feeder wheel 250 in the second position P2 of the coupling member 270. The second feeder wheel 250 and the drive wheel 206 may then rotate at substantially the same speed. In other words, power from the electrical motor 136 may now be transmitted to the second feeder wheel 250 through the one or more gears 138, the drive shaft 134, the drive wheel 206 and the coupling member 270. In the second position P2 of the coupling member 270, the mechanical switch 290 is in the second switch position S2.

The second feeder wheel 250 may further drive the fourth feeder wheel 256. The second filament 114 may now be pulled between the second roller portion 254 of the second feeder wheel 250 and the fourth roller portion 260 of the fourth feeder wheel 256. Hence, the second filament 114 may now be dispensed by the dual filament feeder assembly 110 as the electrical motor 136 drives the second feeder wheel 250. Each of the second roller portion 254 and the fourth roller portion 260 may be at least partially concave. The concave surface may conform with an outer surface of the second filament 114 and may allow appropriate engagement of the second filament 114 with the second roller portion 254 and the fourth roller portion 260.

FIG. 5A schematically shows a perspective view of an embodiment of the coupling member 270, the drive wheel 206, and the shifting member 280 of the dual filament feeder assembly 110. FIG. 5B illustrates an exploded view of the coupling member 270, the drive wheel 206, and the shifting member 280. Referring now to FIGS. 5A and 5B, the coupling member 270 comprises the plurality of inner splines 274 that at least partially engage with the plurality of outer splines 208 of the drive wheel 206. The coupling member 270 comprises the ring 272 having the inner surface 276. The plurality of inner splines 274 are disposed on the inner surface 276 of the coupling member 270. The coupling member 270 further comprises a pair of end flanges 278. The pair of end flanges 278 may protrude from the edges of the ring 272, such that the pair of end flanges 278 may provide an engagement surface therebetween.

Referring now to FIGS. 4A-4C, 5A-5B, the shifting member 280 may be arranged to slide along the longitudinal axis A. The shifting member 280 further comprises an actuating portion 281 extending from the sliding portion 282 and received at least partially between the pair of end flanges 278 of the coupling member 270, such that a linear movement of the shifting member 280 along the support shaft 244 causes a corresponding linear movement of the coupling member 270 along the drive shaft 134. Specifically, a linear movement of the shifting member 280 along the longitudinal axis A causes a corresponding linear movement of the coupling member 270 along the longitudinal axis A. The sliding portion 282 comprises an aperture 502 for receiving the support shaft 244 therethrough. Further, the coupling member 270 can linearly move between the first position P1 (shown in FIG. 4A) and the second position P2 (shown in FIG. 4B). The pair of end flanges 278 may restrict relative linear movement between the shifting member 280 and the coupling member 270. Therefore, the coupling member 270 may move linearly along with the shifting member 280. Further, the ring 272 of the coupling member 270 may also provide a bearing surface to allow the coupling member 270 to rotate relative to the actuating portion 281 of the shifting member 280. This may enable the coupling member 270 to rotate along with the drive wheel 206. In some embodiments, the actuating portion 281 may comprise two parts that are angularly separated from each other and engage an outer surface of the ring 272. However, the actuating portion 281 may have any number of parts that engage with the ring 272.

The shifting member 280 further comprises an engaging portion 283. The engaging portion 283 comprises a lower surface 284, a first side surface 286 extending from the lower surface 284, and a second side surface 288 extending from the lower surface 284 and spaced apart from the first side surface 286. The lower surface 284, the first side surface 286 and the second side surface 288 define a channel 289 therebetween. The channel 289 may be substantially U-shaped. A rear surface 504 of the engaging portion 283 may limit a length of the channel 289. It is noted that the lower surface 284 may be absent, since only the side surfaces 286, 288 are needed to make the coupling between the shifting member 280 and the mechanical switch 290 operational. Nevertheless, the lower surface 284 forms a connection between the two side walls (i.e. the side surfaces) which makes the design more stiff, which avoids unwanted play.

Figure 6:
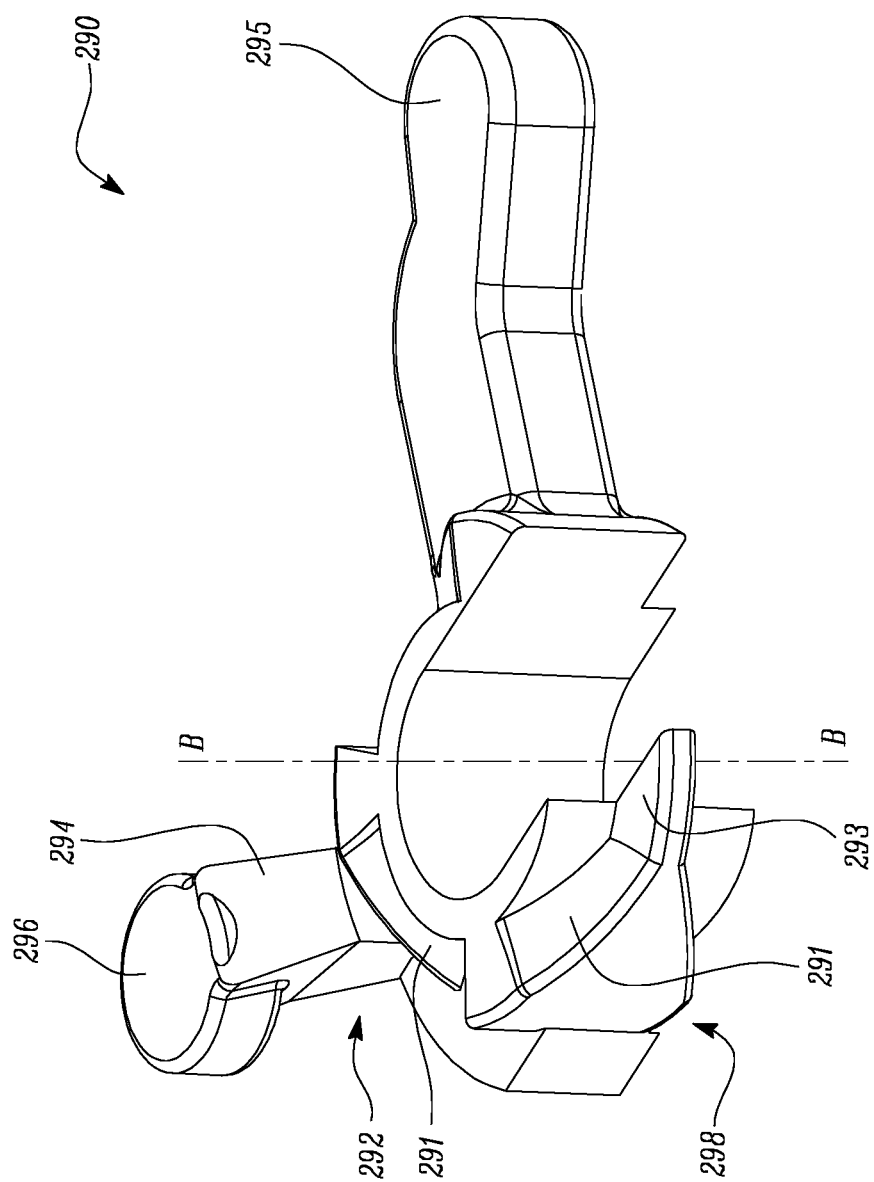
FIG. 6 schematically shows a perspective view of a mechanical switch of the dual filament feeder assembly according to an embodiment of the present invention.

FIG. 6 schematically shows a perspective view of an embodiment of the mechanical switch 290. The mechanical switch 290 comprises an arm 292 engaged with the shifting member 280 (shown in FIGS. 4A-4B and 5A-5B), such that an actuation of the mechanical switch 290 may cause a linear movement of the shifting member 280 and a corresponding movement of the coupling member 270 between the first position P1 and the second position P2. The first position P1 and the second position P2 may correspond to the first switch position S1 and the second switch position S2, respectively. In some embodiments, the mechanical switch 290 is rotatable about a vertical rotation axis B which in practice resembles the axis of the feed channel of the second extruder. The mechanical switch 290 may be supported by surrounding structures (not shown) arranged in the print head to enable rotation of the mechanical switch 290 around the upper part 342 (see FIG. 9) of the second extruder. The mechanical switch 290 may be arranged to rotate about the vertical rotation axis B for movement between the first switch position S1 and the second switch position S2. In some embodiments, the rotation of the mechanical switch 290 about the vertical rotation axis B causes the linear movement of the shifting member 280.

In the example of FIG. 6, the arm 292 of the mechanical switch 290 comprises an elongate portion 294 and an end portion 296 inclined to the elongate portion 294. In some examples, an angle between the elongate portion 294 and the end portion 296 may be in a range from about 20 degrees to about 160 degrees. In some embodiments, the end portion 296 of the mechanical switch 290 is received in the channel 289 (shown in FIGS. 5A and 5B) of the engaging portion 283 of the shifting member 280. In the illustrated embodiment, the end portion 296 of the mechanical switch 290 is disc-shaped. Due to the inclination, the top and bottom of the disc-shaped end portion 296 lie in a plane perpendicular to the axis B and parallel to the surface 284. The disc shape of the end portion 296 of the mechanical switch 290 may allow smooth movement of the shifting member 280 along the longitudinal axis A with the rotation of the mechanical switch 290 about the vertical rotation axis B. However, the end portion 296 may be realized in any shape without limiting the scope of the present disclosure.

The mechanical switch 290 further comprises a curved wedge member 298 configured to rotate about the vertical rotation axis B. The elongate portion 294 of the arm 292 extends from the curved wedge member 298. It is noted that the elongated portion 294 may radially extend from the curved wedge member 298. In that case, the end portion 296 lies in the same plane as the elongated portion 294 and there is no need to incline the end portion 296 relative to the elongated portion 294. The curved wedge member 298 comprises a plurality of ramp sections 291 that extend from a base surface 293 of the curved wedge member 298. In some embodiments, the plurality of ramp sections 291 may be provided on both sides of the base surface 293 (top and bottom). The mechanical switch 290 further comprises a lever portion 295 extending from the curved wedge member 298 and angularly spaced apart from the arm 292. In some embodiments, the curved wedge member 298 may be arranged to receive an upper part of a cylindrical extruder (e.g., the second extruder 128 shown in FIG. 2) having a flange at a top end of the cylindrical extruder. The curved wedge member 298 may comprise an opening for receiving the upper part of the cylindrical extruder.

Figures 7A, 7B:
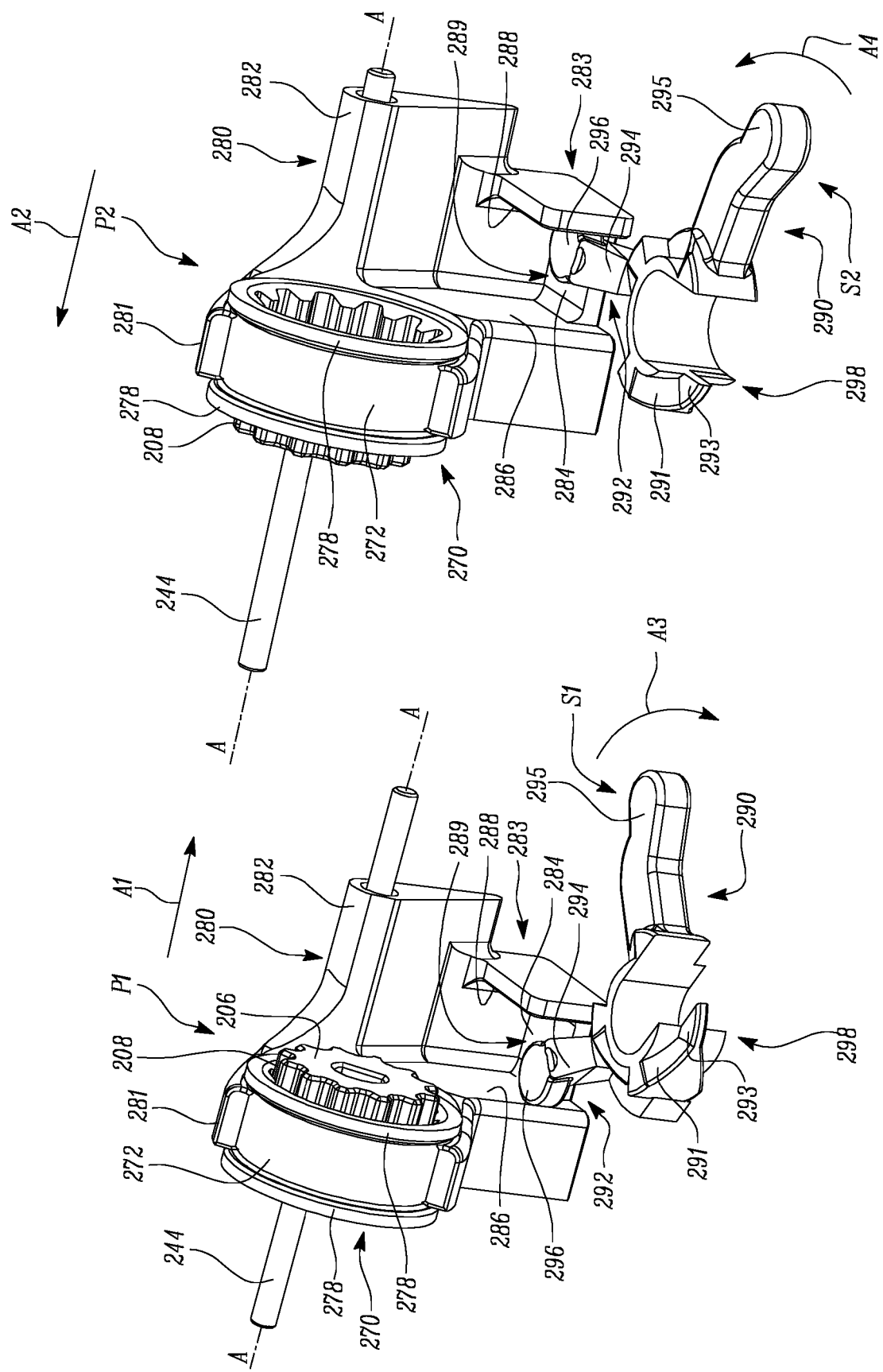
FIG. 7A schematically shows a perspective view of the coupling member, the drive wheel, the shifting member, and the mechanical switch of the dual filament feeder assembly in the first position of the coupling member according to an embodiment of the present invention.
FIG. 7B schematically shows a perspective view of the coupling member, the drive wheel, the shifting member, and the mechanical switch in the second position of the coupling member according to an embodiment of the present invention.

FIG. 7A schematically shows an embodiment of the coupling member 270, the drive wheel 206, the shifting member 280, and the mechanical switch 290 of the dual filament feeder assembly 110 in the first position P1 on the coupling member 270. The first position P1 of the coupling member 270 may correspond to the first switch position S1. FIG. 7B illustrates the coupling member 270, the drive wheel 206, the shifting member 280, and the mechanical switch 290 in the second position P2 on the coupling member 270. The second position P2 of the coupling member 270 may correspond to the second switch position S2.

The arm 292 of the mechanical switch 290 is at least partially and movably received within the channel 289.

Specifically, the end portion 296 of the arm 292 is at least partially and movably received within the channel 289. In some embodiments, the end portion 296 is arranged to slide relative to the lower surface 284 of the engaging portion 283 prior to selectively engaging with one of the first side surface 286 and the second side surface 288.

Referring now to FIGS. 4A-7B, the actuation of the mechanical switch 290 causes a linear movement of the shifting member 280 along the longitudinal axis A relative to the support shaft 244 (shown in FIGS. 4A-4B). In the first switch position S1 of the mechanical switch 290 (shown in FIG. 7A), the end portion 296 may engage with the first side surface 286 of the engaging portion 283. As the mechanical switch 290 moves from the first switch position S1 to the second switch position S2, the arm 292 of the mechanical switch 290 may rotate about the vertical rotation axis B causing the end portion 296 to engage with the second side surface 288. Engagement of the arm 292 with the second side surface 288 and further movement of the mechanical switch 290 may cause the shifting member 280 to move along the longitudinal axis A. Thus, the rotational movement of the mechanical switch 290 causes the linear movement of the shifting member 280.

The shifting member 280 may correspondingly move the coupling member 270 along the drive shaft 134 via the actuating portion 281. When the mechanical switch 290 moves from the first switch position S1 to the second switch position S2, the shifting member 280 may move relative to the support shaft 244, such that the coupling member 270 disengages from the first splined portion 226, slides with respect to the drive wheel 206, and engages with the second splined portion 262, while being at least partially engaged with the plurality of outer splines 208 of the drive wheel 206 at all times. Specifically, the coupling member 270 slides relative to the plurality of outer splines 208 of the drive wheel 206 to engage with the second splined portion 262. Therefore, the coupling member 270 drivably couples the drive wheel 206 with the second splined portion 262 of the second feeder wheel 250 in the second position P2 of the coupling member 270. In the second position P2 of the coupling member 270, the end portion 296 may engage with the second side surface 288 of the engaging portion 283, as shown in FIG. 7B.

In the second position P2, the coupling member 270 may couple the second feeder wheel 250 with the drive wheel 206 for drivably coupling the electrical motor 136 (shown in FIGS. 2-3B) with the second feeder wheel 250. The second feeder wheel 250 may then rotate the fourth feeder wheel 256 causing the second filament 114 (shown in FIG. 2) to be pulled between the second feeder wheel 250 and the fourth feeder wheel 256.

Similarly, movement of the mechanical switch 290 from the second switch position S2 (shown in FIG. 7B) to the first switch position S1 (shown in FIG. 7A) may cause rotation of the arm 292 about the vertical rotation axis B to engage with the first side surface 286 of the engaging portion 283. Engagement of the arm 292 with the first side surface 286 and further movement of the mechanical switch 290 may cause the shifting member 280 to move along the longitudinal axis A.

The movement of the shifting member 280 and the coupling member 270 may be reversed when the mechanical switch 290 is moved from the second switch position S2 to the first switch position S1. The shifting member 280 may move the coupling member 270 along the drive shaft 134 via the actuating portion 281. The shifting member 280 may move relative to the support shaft 244, such that the coupling member 270 disengages from the second splined portion 262, slides with respect to the drive wheel 206, and engages with the first splined portion 226. Therefore, the coupling member 270 couples the drive wheel 206 with the first splined portion 226 of the first feeder wheel 210 in the first position P1. In the first position P1 of the coupling member 270, the end portion 296 may engage with the first side surface 286 of the engaging portion 283. In some embodiments, the electrical motor 136 may be stopped momentarily to allow movement of the coupling member 270 between the first position P1 and the second position P2. In other words, the electrical motor 136 may be inactive for the time duration during which the coupling member 270 moves between the first position P1 and the second position P2.

In the first position P1, the coupling member 270 may couple the first feeder wheel 210 with the drive wheel 206 for drivably coupling the electrical motor 136 (shown in FIGS. 2-3B) with the first feeder wheel 210. The first feeder wheel 210 may then rotate the third feeder wheel 218 causing the first filament 112 (shown in FIG. 2) to be pulled between the first feeder wheel 210 and the third feeder wheel 218.

The sliding movement of the end portion 296 of the arm 292 relative to the lower surface 284 of the engaging portion 283 may allow a certain degree of play between the mechanical switch 290 and the shifting member 280. Such play may improve an engagement between the coupling member 270 and the first feeder wheel 210 or the second feeder wheel 250. However, in some other embodiments, the arm 292 may be fixedly coupled to the engaging portion 283, such that a rotation of the arm 292 causes a simultaneous linear movement of the shifting member 280 without any play.

It should be understood that the linear movement of the shifting member 280 along the longitudinal axis A may be achieved without utilizing the mechanical switch 290 as well. For example, any suitable drive may be utilized to move the shifting member 280 along the longitudinal axis A. In some examples, a rotating geared drive shaft may be engaged with the shifting member 280. The geared drive shaft may be received by the sliding portion 282, such that the sliding portion 282 moves relative to the longitudinal axis A with the rotation of the geared drive shaft.

In some embodiments, the linear movement of the shifting member 280 along the longitudinal axis A may be achieved without the rotation of the mechanical switch 290. For example, in such cases, a (non-rotational) mechanical switch may be arranged fixedly on or coupled directly to the shifting member 280, and may be actuated appropriately to move the shifting member 280 along the longitudinal axis A. Actuation may be achieved by pulling or pushing a lever arm arranged on the switch, which lever arm extends out of the housing of the print head. It is also conceivable that actuation of the switch is achieved in an electrical way by using e.g. an electrical actuator coupled to the switch. The also account for the rotational switch mentioned above.

The first feeder wheel 210 may not receive any power from the electrical motor 136 in the second position P2 of the coupling member 270. Thus, the first feeder wheel 210 may not dispense the first filament 112 to the first extruder 124 (shown in FIG. 2) in the second position P2 of the coupling member 270. Similarly, the second feeder wheel 250 may not receive any power from the electrical motor 136 in the first position P1 of the coupling member 270. Therefore, the second feeder wheel 250 may not dispense the second filament 114 (shown in FIG. 2) to the second extruder 128 (shown in FIG. 1B) in the first position P1 of the coupling member 270. Consequently, the first filament 112 and the second filament 114 may be selectively dispensed by the dual filament feeder assembly 110 based on the position of the coupling member 270.

Figure 8:
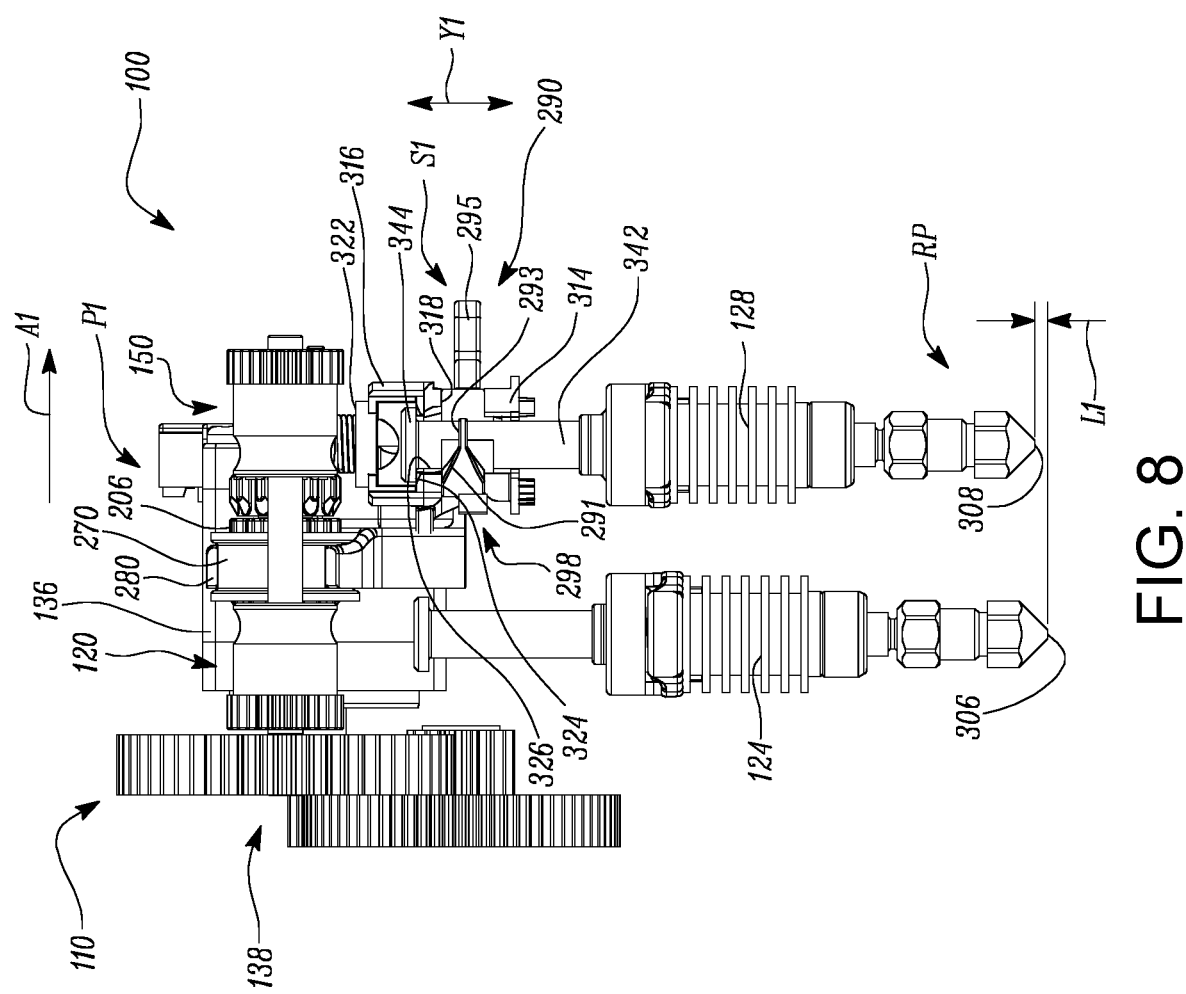
FIG. 8 schematically shows a front view of a part of the dual extruder print head in the second position of the coupling member.

FIG. 8 schematically shows an embodiment of a front view of the dual extruder print head 100 in the first position P1 of the coupling member 270. The dual extruder print head 100 comprises the dual filament feeder assembly 110. Some of the components of the dual extruder print head 100 are not shown in FIG. 8 for clarity.

The dual extruder print head 100 comprises the first extruder 124 and the second extruder 128. The first extruder 124 and the second extruder 128 may extrude a molten material after heat processing a consumable material (e.g., the first filament 112 or the second filament 114 shown in FIG. 2) during an additive manufacturing cycle. The first extruder 124 and the second extruder 128 may comprise separate heating units in heating engagement with the respective extruders so as to heat the consumable material as the consumable material passes through the first extruder 124 and the second extruder 128. In some embodiments, the heating units may comprise a conductive ceramic or a wire, such as an alloy of nickel, chromium, and iron. The first and second extruders 124, 128 comprise first and second extrusion outlets 306, 308, respectively, through which the molten consumable material may be released.

The dual extruder print head 100 further comprises the dual filament feeder assembly 110 having the first feeder 120 and the second feeder 150. The dual filament feeder assembly 110 further comprises the electrical motor 136 and the drive wheel 206 driven by the electrical motor 136 through the one or more gears 138. The dual filament feeder assembly 110 further comprises the coupling member 270 arranged to selectively couple the drive wheel 206 with the first feeder wheel 210 (shown in FIG. 2) or the second feeder wheel 250 (shown in FIG. 2). In the configuration shown in FIG. 8, the coupling member 270 drivably couples the drive wheel 206 with the first feeder wheel 210 in the first position P1 of the coupling member 270. In the first position P1 of the coupling member 270, the dual filament feeder assembly 110 may dispense the first filament 112 to the first extruder 124.

The dual extruder print head 100 further comprises the mechanical switch 290 coupled with the second extruder 128. Further, the mechanical switch 290 comprises the curved wedge member 298 arranged to receive an upper part 342 of the second extruder 128. The second extruder 128 comprises a flange 344 at a top end of the second extruder 128. The first position P1 of the coupling member 270 may correspond to the first switch position S1. The mechanical switch 290 engages with the shifting member 280.

The second extruder 128 is in a raised position RP when the coupling member 270 is in the first position P1. In the raised position RP of the second extruder 128, the second extruder 128 may be positioned higher than the first extruder 124 by a distance L1. Such an arrangement may avoid interference between the first and second extruders 124, 128 when one of the extruders may be actively extruding material while the other extruder may be momentarily idle. In the raised position RP of the second extruder 128, the mechanical switch 290 is in the first switch position S1.

The mechanical switch 290 may rest on a base member 314 and may support a lift member 316. In some embodiments, the base member 314 may be fixed while the lift member 316 may be movable with respect to the base member 314. The lift member 316 comprises a lower end 318 and an upper end 322. The lower end 318 of the lift member 316 may be in wedging engagement with the curved wedge member 298 of the mechanical switch 290. The curved wedge member 298 comprises the plurality of ramp sections 291 extending from the base surface 293 of the mechanical switch 290. In some embodiments, the vertical rotation axis B of the mechanical switch 290 (shown in FIG. 6) may coincide with a central axis of the second extruder 128.

The lower end 318 of the lift member 316 further comprises a rim 324 that selectively engages with the flange 344 disposed at the top end of the second extruder 128. The rim 324 of the lift member 316 may protrude inwardly from a circumference of the lower end 318 of the lift member 316 and may encircle, at least in part, the upper part 342 of the second extruder 128. In some embodiments, the flange 344 of the lift member 316 may be larger in diameter than a diameter of an inner end 326 of the rim 324 of the lift member 316.

Figure 9:
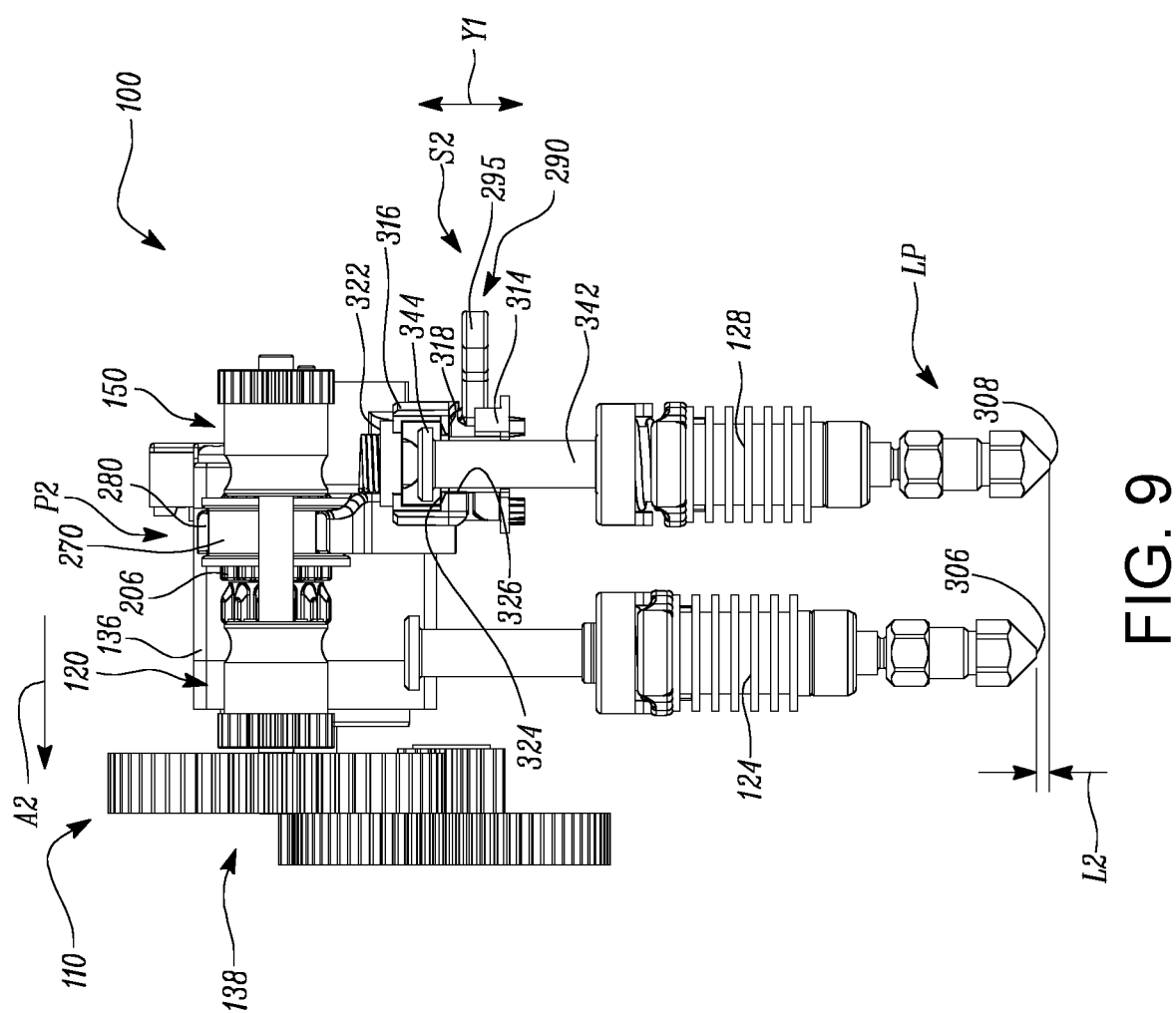
FIG. 9 schematically shows a front view of the dual extruder print head of FIG. 8 in the first position of the coupling member.

FIG. 9 schematically shows an embodiment of a front view of the dual extruder print head 100 in the second position P2 of the coupling member 270. The second extruder 128 is in a lowered position LP when the coupling member 270 is in the second position P2. In the lowered position LP, the second extruder 128 may be positioned lower than the first extruder 124 by a distance L2. In some embodiments, the distance L1 may be equal to the distance L2. In other embodiments, the distance L1 may be less than or greater than the distance L2.

In the second position P2 of the coupling member 270, the mechanical switch 290 may be in the second switch position S2. Further, the coupling member 270 drivably couples the drive wheel 206 with the second feeder wheel 250 (shown in FIG. 2) in the second position P2 of the coupling member 270. In the second position P2 of the coupling member 270, the dual filament feeder assembly 110 may dispense the second filament 114 (shown in FIG. 2) to the second extruder 128. Therefore, the second extruder 128 may actively extrude material.

Referring now to FIGS. 8 and 9, as the mechanical switch 290 moves from the first switch position S1 (shown in FIG. 8) to the second switch position S2 (shown in FIG. 9), the coupling member 270 may move from the first position P1 to the second position P2. The second extruder 128 may move from the raised position RP to the lowered position LP along a vertical axis Y1 as the coupling member 270 moves from the first position P1 to the second position P2. The movement of the mechanical switch 290 from the first switch position S1 to the second switch position S2 may cause a linear movement of the shifting member 280 and a corresponding movement of the coupling member 270 from the first position P1 to the second position P2.

As the mechanical switch 290 moves from the second switch position S2 back to the first switch position S1, the coupling member 270 may move from the second position P2 to the first position P1. Further, the coupling member 270 may move between the first position P1 and the second position P2 based on movement of the mechanical switch 290 between the first switch position S1 and the second switch position S2. The position of the coupling member 270 may determine the operation of the first extruder 124 and the second extruder 128. In some embodiments, heating of the first extruder 124 and the second extruder 128 may be controlled and monitored by the electronic assembly 132 (shown in FIG. 1B) based on the position of the mechanical switch 290 and/or the position of the coupling member 270.

Figure 10B:
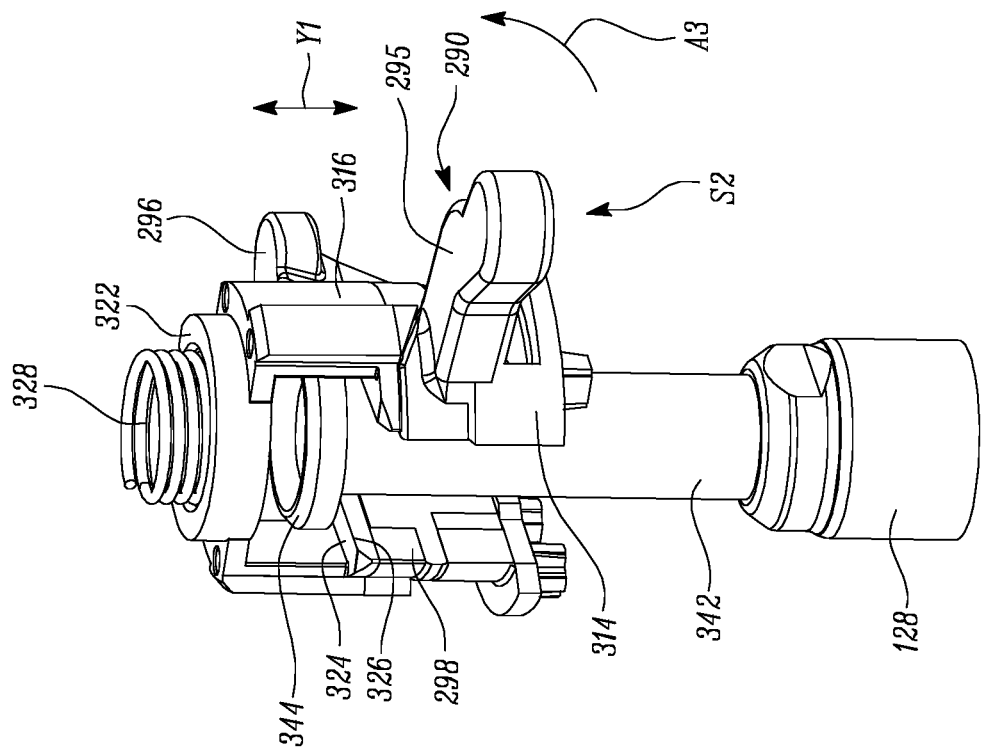
FIGS. 10A and 10B schematically show perspective views of a lift member and a mechanical switch in a second switch position and a first switch position, respectively, according to an embodiment of the present invention.
Figure 10A:
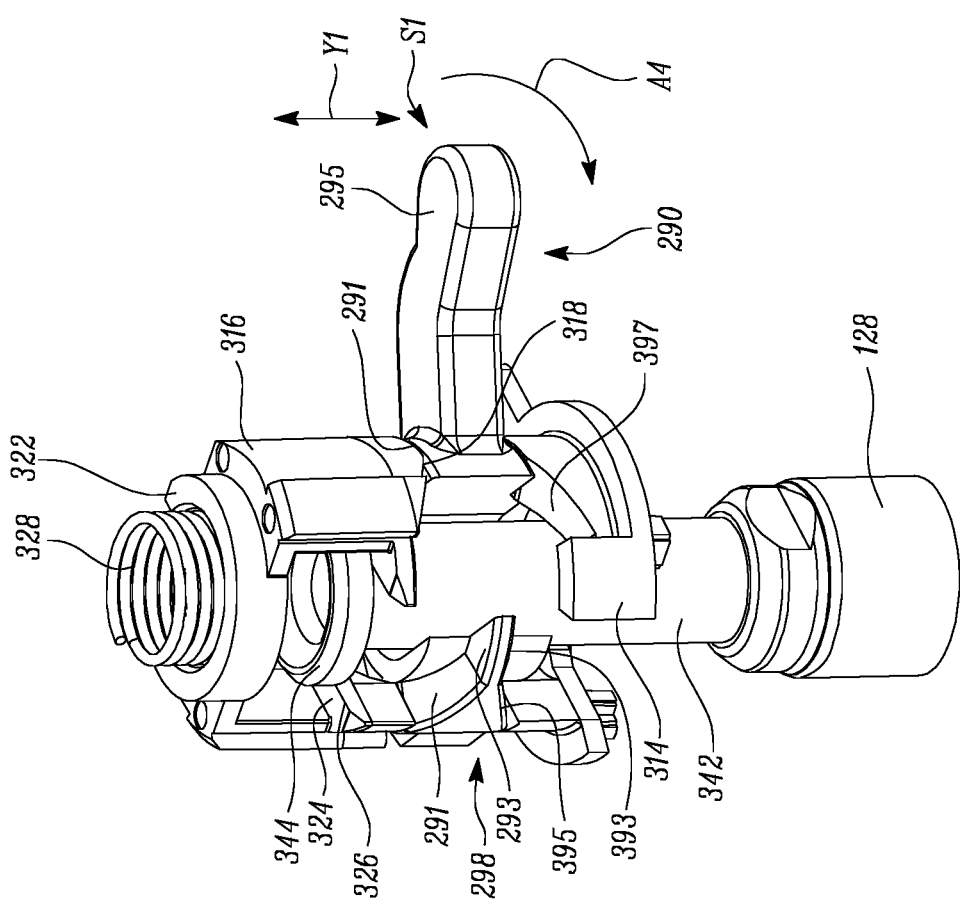

FIGS. 10A and 10B schematically show the lift member 316 and the mechanical switch 290 in the first switch position S1 and the second switch position S2, respectively. In some embodiments, the mechanical switch 290 may be arranged to rotate with respect to the base member 314 and the lift member 316. The curved wedge member 298 of the mechanical switch 290 may be in wedging engagement with the lower end 318 of the lift member 316. Further, the curved wedge member 298 may comprise the plurality of ramp sections 291 in sliding engagement with the lower end 318 of the lift member 316. The curved wedge member 298 may be arranged to receive the upper part 342 of the second extruder 128 (shown partially). The second extruder 128 further comprises the flange 344 at the top end of the second extruder 128. The first switch position S1 and the second switch position S2 may correspond to the raised position RP (shown in FIG. 8) and the lowered position LP (shown in FIG. 9), respectively, of the second extruder 128.

The lift member 316 may receive the flange 344 of the second extruder 128. The rim 324 of the lift member 316 may protrude inwardly from the circumference of the lower end 318 of the lift member 316. The flange 344 of the lift member 316 may be larger in diameter than the diameter of the inner end 326 of the rim 324 of the lift member 316.

Referring now to FIGS. 10A and 10B, as the mechanical switch 290 moves from the first switch position S1 (shown in FIG. 10A) to the second switch position S2 (shown in FIG. 10B), the lower end 318 of the lift member 316 may slide down the plurality of ramp sections 291. Further, the rim 324 of the lift member 316 may move down and disengage from the flange 344 of the second extruder 128 allowing the lift member 316, and thus, the upper part 342 of the second extruder 128 to be lowered as the lower end 318 slides down the plurality of ramp sections 291. The plurality of ramp sections 291 may allow the lift member 316 to be lowered and raised along the vertical axis Y1 based on movement of the mechanical switch 290. It should be understood that corresponding ramp sections may also be provided at the lower end 318 of the lift member 316 for a smooth engagement of the lower end 318 with the plurality of ramp sections 291.

Referring to FIG. 10A, the curved wedge member 298 may comprise a plurality of ramp sections 395 extending from a base surface 393 and opposite to the plurality of ramp sections 291. The plurality of ramp sections 395 may engage with a plurality of ramp sections 397 disposed on the base member 314 to further raise the upper part 342 of the second extruder 128. In some embodiments, the base member 314, the lift member 316 and the mechanical switch 290 may comprise multiple ramp sections with varying heights.

The upper end 322 of the lift member 316 comprises a resilient biasing member 328 in downward biasing engagement with the lift member 316 with respect to the vertical axis Y1. In some embodiments, the resilient biasing member 328 may comprise a spring element for continuously pushing the lift member 316 downward, and thus, biasing the second extruder 128 downward. When the lift member 316 and the second extruder 128 are moved to the raised position RP, the resilient biasing member 328 may store potential energy which may be released when the lift member 316 and the second extruder 128 are restored to the lowered position LP.

Referring now to FIGS. 1A-10B, the dual extruder print head 100 may extrude either the first filament 112 or the second filament 114 based on the position of the coupling member 270. In some embodiments, during the additive manufacturing cycle, molten material may be extruded from the first and second extrusion tips 306, 308 to be deposited in a layer-by-layer manner on a build platform. In some embodiments, the dual extruder print head 100 may operate based on inputs from a controller (not shown). The build platform may define a start-print plane or surface.

In some embodiments, the dual extruder print head 100 may first utilize the first filament 112 for a first layer in the additive manufacturing cycle. In such an embodiment, the second extruder 128 may be in the raised position RP (shown in FIG. 8), such that the second extrusion outlet 308 is positioned higher than the first extrusion outlet 306 by the distance L1. Further, the coupling member 270 may be in the first position P1 and the mechanical switch 290 may be in the first switch position S1. The dual filament feeder assembly 110 may dispense the first filament 112 through the first feeder 120. The first extruder 124 may receive the first filament 112 from the first feeder 120 and may deposit the extruded material on the build platform to form a layer of the extruded material. Further, the dual extruder print head 100 may move relative to the build platform to generate the layer.

In some embodiments, the dual extruder print head 100 may utilize the second filament 114 for one or more subsequent layers during the additive manufacturing cycle. As the dual extruder print head 100 may be switched from first extruder 124 to the second extruder 128, the mechanical switch 290 may move from the first switch position S1 to the second switch position S2. The end portion 296 of the mechanical switch 290 may disengage from the first side surface 286 of the engaging portion 283 and move relative to the lower surface 284 to engage with the second side surface 288. Further movement of the end portion 296 may cause the shifting member 280 to move relative to the support shaft 244 along the longitudinal axis A. The movement of the shifting member 280 may cause a corresponding linear movement of the coupling member 270 along the drive shaft 134. The shifting member 280 actuates the coupling member 270 via the actuating portion 281. The coupling member 270 further linearly moves relative of the plurality of outer splines 208 of the drive wheel 206. Thus, the coupling member 270 may disengage from the first splined portion 226 of the first feeder wheel 210 and engage with the second splined portion 262 of the second feeder wheel 250. Therefore, the coupling member 270 may now drivably couple the second feeder wheel 250 with the drive wheel 206 in the second position P2 of the coupling member 270.

The movement of the mechanical switch 290 from the first switch position S1 to the second switch position S2 may also cause the lower end 318 of the lift member 316 to slide down the plurality of ramp sections 291 of the mechanical switch 290. The lift member 316 may be pushed down due to the biasing force of the resilient biasing member 328 causing the flange 344 at the top end of the upper part 342 of the second extruder 128 to be lowered till the second extrusion outlet 308 may be positioned lower than the first extrusion outlet 306 of the first extruder 124 by the distance L2 (shown in FIG. 9). In the second position P2 of the coupling member 270, the electric motor 136 may drive the second feeder wheel 250 allowing the second filament 114 to be dispensed to the second extruder 128. Further, the second extruder 128 may extrude molten material through the second extrusion outlet 308.

The dual extruder print head 100 may be switched back to the first extruder 124 from the second extruder 128 by actuating the mechanical switch 290 back to the first switch position S1. The end portion 296 of the mechanical switch 290 may engage with the first side surface 286 of the engaging portion 283 to cause movement of the shifting member 280 relative to the support shaft 244 along the longitudinal axis A. The movement of the shifting member 280 may cause a corresponding movement of the coupling member 270 to the first position P1 and may lift the second extruder 128 again to the raised position RP (shown in FIG. 8).

Figure 11:
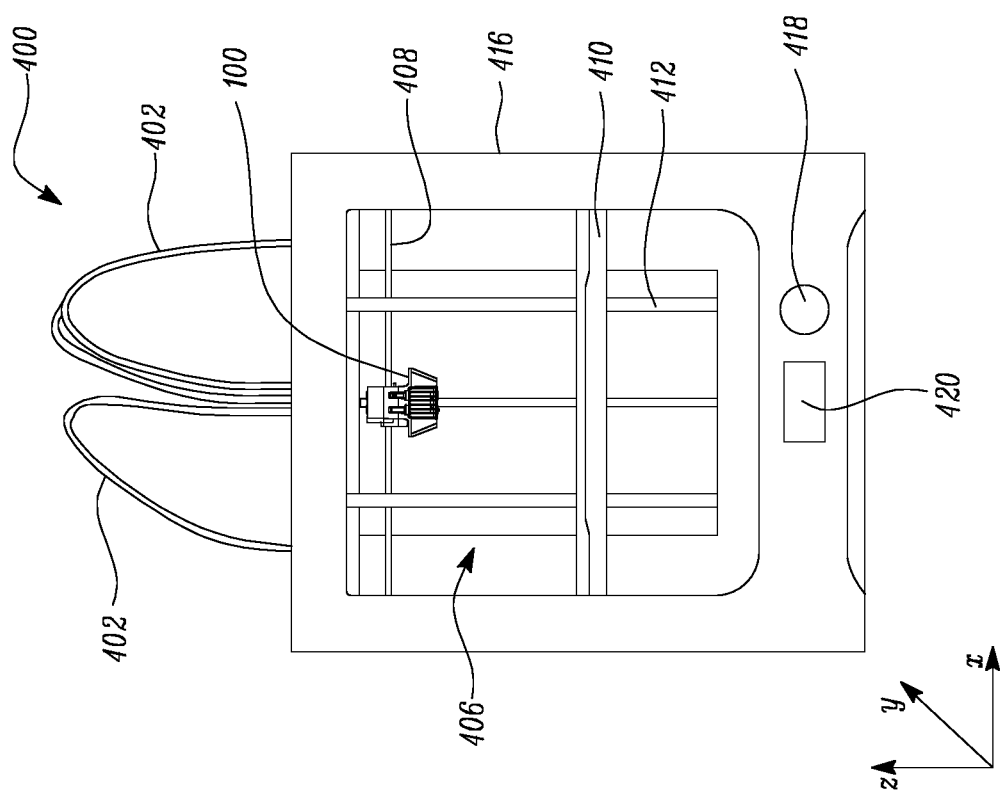
FIG. 11 schematically shows a front view of an additive manufacturing system according to an embodiment of the present invention.

FIG. 11 schematically shows a front view of an embodiment of an additive manufacturing system 400. The additive manufacturing system 400 comprises a chamber 406, which may be an enclosed environment that comprises a build plate and assemblies for manufacturing parts/components (e.g., 3D parts). The additive manufacturing system 400 further comprises the dual extruder print head 100 supported on the guide rail 408 and disposed inside the chamber 406. The dual extruder print head 100 has been described in detail above with reference to FIGS. 1A-10B. The dual extruder print head 100 may build parts/components on a build plate 410 in a layer-by-layer manner from a software model, such as a computer-aided design (CAD) model.

In some embodiments, the guide rail 408 together with other parts of a gantry 412, may allow movement of the dual extruder print head 100 along an x-y plane within the chamber 406 based on inputs provided by a controller (not shown). Further, the print plate 410 may be movable along a vertical z-axis by the gantry 412 based on commands provided by the controller. Alternatively, the additive manufacturing system 400 may allow movement of the dual extruder print head 100 along the x, y, and z axis through one or more of the guide rails 408. The guide rail 408 may utilize any suitable bridge-type gantry or robotic mechanism for moving the dual extruder print head 100 that may comprise one or more motors (e.g., stepper motors and encoded DC motors), gears, pulleys, belts, screws, robotic arms, and/or the like. In some embodiments, the print plate 410 may alternatively move in the x-y plane while the dual extruder print head 100 moves along the z-axis. Other similar arrangements may also be utilized such that either or both of the print plate 410 and the dual extruder print head 100 may be moveable relative to each other. In some embodiments, the print plate 410 and/or the dual extruder print head 100 can be aligned at an angle with respect to the x, y, or z axis.

As described above with reference to FIGS. 1A to 10B, the dual extruder print head 100 comprises the first and second extruders 124, 128 arranged to receive a consumable material, for example, the first and second filaments 112, 114, respectively. The consumable material may be melted by the first and second extruders 124, 128 to produce a molten material, and the molten material may then be deposited (or extruded) on the print plate 410.

The consumable material may be provided by material storage assemblies (not shown) mounted on the additive manufacturing system 400 or otherwise accessible to the additive manufacturing system 400. The material storage assemblies may supply the consumable material to the dual extruder print head 100 while allowing the consumable material to be loaded, replaced, or removed. For example, the material storage assemblies may retain the consumable material on a wound spool, a spool-less coil, or any other suitable supply arrangement.

In some embodiments, one of the first and second extruders 124, 128 may supply a consumable part material while the other extruder 124 or 128 may supply a consumable support material. In some embodiments, the consumable part material and the consumable support material may be mounted on separate material storage assemblies. In some embodiments, the consumable part material and the consumable support material may differ in material properties.

In some embodiments, the chamber 406 may be heated (e.g., by circulating heated air) to reduce a rate at which the manufactured parts/components and support materials solidify after being extruded or deposited (e.g., to reduce distortions and curling), or otherwise maintained in a temperature-controlled environment. In some embodiments, the chamber 406 may be omitted and/or replaced with other types of heated, cooled, and/or ambient build environments.

The chamber 406 may be a part of a casing 416 having multiple sub-structural components, such as support frames, housing walls, and/or the like that support the dual extruder print head 100 and the guide rail 408. In some embodiments, the casing 416 may comprise arrangements for receiving the material storage assemblies.

The additive manufacturing system 400 may further comprise a user input 418, such as a button, a switch, a touch-type graphical user interface, etc. The user input 418 may be used to control an operational status of the additive manufacturing system 400 or operational parameters thereof. The additive manufacturing system 400 further comprises a user interface 420 arranged to output one or more operational parameters of the additive manufacturing system 400. Further, the additive manufacturing system 400 may comprise an input port for receiving power. Additional ports may also be provided for data communication.

In some embodiments, the controller may be arranged to monitor and control one or more components or operations of the additive manufacturing system 400. Further, the controller may comprise one or more control circuits and/or one or more computers for carrying out the intended functions. The controller may be embodied in a number of different ways. For example, the controller may be embodied as various processing means, such as one or more of a microprocessor or other processing elements, a coprocessor, or various other computing or processing devices including integrated circuits, such as an ASIC (application specific integrated circuit), an FPGA (field programmable gate array), or the like.

In some embodiments, the controller may be arranged to execute instructions stored in a memory or otherwise accessible to the controller. As such, whether configured by hardware or by a combination of hardware and software, the controller may represent an entity capable of performing operations according to some embodiments while configured accordingly. For example, one or more of control functions performed by the controller may be implemented in hardware, software, firmware, and the like, or a combination thereof. The controller may comprise computer-based hardware, such as data storage devices, processors, memory modules, and/or the like, which may be external and/or internal to the additive manufacturing system 400. In some embodiments, the controller may communicate with the dual extruder print head 100 and/or other components (e.g., the guide rail 408, one or motors of the gantry 412, various sensors, calibration devices, user interfaces, and/or user input devices) of the additive manufacturing system 400 through a wired or wireless communication interface.

FIG. 12 schematically shows an embodiment of the dual extruder print head 100 disposed inside the chamber 406 of the additive manufacturing system 400. The dual extruder print head 100 may be supported on the guide rail 408 disposed inside the chamber 406 that allows movement of the dual extruder print head 100 in operational directions. The dual extruder print head 100 further comprises the guide tubes 402 for providing consumable materials. The dual extruder print head 100 further comprises the inlet 106 for providing power to the dual extruder print head 100.

Referring to FIGS. 1A-12, the dual extruder print head 100 further comprises the first and second extruders 124, 128. The first and second extruders 124, 128 may be arranged to receive the consumable material which may be melted by the first and second extruders 124, 128 to produce a molten material. The dual extruder print head 100 further comprises the mechanical switch 290 (partly shown in FIG. 12) having the lever portion 295 that may be moved between the first switch position S1 and the second switch position S2 to allow selective operation of one of the first and second extruders 124, 128. The dual extruder print head 100 may operate one extruder at a time during an additive manufacturing cycle.

The mechanical switch 290 may be selectively movable between the first switch position S1 and the second switch position S2 by a switch bay 426 through the lever portion 295 of the mechanical switch 290. In some embodiments, the switch bay 426 may be fixedly coupled to the casing 416 (shown in FIG. 11) of the additive manufacturing system 400. The lever portion 295 of the mechanical switch 290 may be received in a slot 428 disposed on the switch bay 426 such that the mechanical switch 290 may move between the first switch position S1 and the second switch position S2 based on forward and reverse movements of the dual extruder print head 100.

During an additive manufacturing cycle, the dual extruder print head 100 may move towards the switch bay 426 along the guide rail 408, such that the lever portion 295 of the mechanical switch may be received in the slot 428 of the switch bay 426. Subsequently, forward or reverse movements of the dual extruder print head 100 may cause the lever portion 295 to rotate about a vertical rotation axis (e.g., the vertical rotation axis B) so as to shift the mechanical switch 290 between the first switch position S1 and the second switch position S2. In some embodiments, the lever portion 295 of the mechanical switch 290 may be manually movable between the first switch position S1 and the second switch position S2. In some embodiments, the movement of the lever portion 295 of the mechanical switch 290 may be automatically controlled by a controller (not shown) through an actuator mounted on the dual extruder print head 100.

The present invention has been described above with reference to a number of exemplary embodiments as shown in the drawings. Modifications and alternative implementations of some parts or elements are possible and are included in the scope of protection as defined in the appended claims. It should be noted that the above-mentioned embodiments illustrate rather than limit the invention, and that those skilled in the art will be able to design many alternative embodiments. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage.

The invention claimed is:

1. A dual filament feeder assembly for an additive manufacturing system, the dual filament feeder assembly comprising:
   a drive shaft having a length on a longitudinal axis;
   a drive wheel connected to the drive shaft, the drive wheel having an extension on the longitudinal axis between opposing first and second sides;
   a first feeder wheel rotatably arranged around the drive shaft at the first side of the drive wheel;
   a second feeder wheel rotatably arranged around the drive shaft at the second side of the drive wheel opposite to the first side;
   a coupling member arranged to selectively couple the drive wheel (206) with one of the first feeder wheel (210) and the second feeder wheel; and
   a shifting member arranged to move the coupling member between a first position and a second position, such that:
   the coupling member drivably couples the drive wheel with the first feeder wheel in the first position of the coupling member; and
   the coupling member drivably couples the drive wheel with the second feeder wheel in the second position of the coupling member.

2. The dual filament feeder assembly according to claim 1, wherein:
   the coupling member comprises a ring with a plurality of inner splines arranged on an inner surface of the ring;
   the first feeder wheel comprises a first splined portion that is at least partially engaged with the plurality of inner splines of the coupling member in the first position of the coupling member;
   the second feeder wheel comprises a second splined portion that is at least partially engaged with the plurality of inner splines of the coupling member in the second position of the coupling member;
   the drive wheel comprises a plurality of outer splines slidably and at least partially engaging with the plurality of inner splines of the coupling member; and
   the coupling member is slidable over the drive wheel between the first position and the second position.

3. The dual filament feeder assembly according to claim 1, wherein:
   the first feeder wheel further comprises a first roller portion for contact with a first filament; and
   the second feeder wheel further comprises a second roller portion for contact with a second filament.

4. The dual filament feeder assembly according to claim 1, further comprising a support shaft arranged in parallel relative to the drive shaft, wherein the shifting member comprises a sliding portion that receives the support shaft therethrough, such that the shifting member is slidable along the support shaft.

5. The dual filament feeder assembly according to claim 4, wherein:
   the coupling member further comprises a pair of end flanges; and
   the shifting member further comprises an actuating portion extending from the sliding portion and received at least partially between the pair of end flanges of the coupling member, such that a linear movement of the shifting member along the support shaft causes a corresponding linear movement of the coupling member along the drive shaft.

6. The dual filament feeder assembly according to claim 1, further comprising a mechanical switch that comprises an arm engaged with the shifting member, such that an actuation of the mechanical switch causes a linear movement of the shifting member and a corresponding movement of the coupling member between the first position and the second position.

7. The dual filament feeder assembly according to claim 6, wherein the mechanical switch is rotatable about a vertical rotation axis.

8. The dual filament feeder assembly according to claim 7, wherein:
- the shifting member further comprises an engaging portion, the engaging portion comprising a lower surface, a first side surface extending from the lower surface, and a second side surface extending from the lower surface and spaced apart from the first side surface, the lower surface, the first side surface and the second side surface defining a channel therebetween; and
- the arm of the mechanical switch is at least partially and movably received within the channel.

9. The dual filament feeder assembly according to claim 8, wherein the arm of the mechanical switch comprises an elongate portion and an end portion inclined to the elongate portion, and wherein the end portion is arranged to slide relative to the lower surface of the engaging portion prior to selectively engaging with one of the first side surface and the second side surface.

10. The dual filament feeder assembly according to claim 9, wherein the end portion is disc-shaped.

11. The dual filament feeder assembly according to claim 7, wherein the mechanical switch further comprises a curved wedge member configured to rotate about the vertical rotation axis, and wherein the curved wedge member is arranged to receive an upper part of a cylindrical extruder having a flange at a top end of the cylindrical extruder.

12. The dual filament feeder assembly according to claim 1, further comprising an electrical motor for driving the drive shaft.

13. A dual extruder print head for an additive manufacturing system, the dual extruder print head comprising the dual filament feeder assembly according to claim 1.

14. The dual extruder print head according to claim 13, further comprising:
- a first dock for installing a first extruder that, at least in use, receives a first filament from the first feeder wheel; and
- a second dock for installing a second extruder that, at least in use, receives a second filament from the second feeder wheel.

15. The dual extruder print head according to claim 13 and further comprising a mechanical switch that comprises an arm engaged with the shifting member, such that an actuation of the mechanical switch causes a linear movement of the shifting member and a corresponding movement of the coupling member between the first position and the second position, wherein the mechanical switch (290) is coupled with the second extruder (128), such that:
- the second extruder is in a raised position when the coupling member is in the first position; and
- the second extruder is in a lowered position (LP) when the coupling member is in the second position.

16. An additive manufacturing system comprising the dual extruder print head according to claim 13.

17. The dual filament feeder assembly according to claim 1, wherein the drive wheel has respective first and second planar faces on the first and second sides.

* * * * *